US012315523B2

(12) United States Patent
McGrath

(10) Patent No.: US 12,315,523 B2
(45) Date of Patent: *May 27, 2025

(54) MULTICHANNEL AUDIO ENCODE AND DECODE USING DIRECTIONAL METADATA

(71) Applicant: Dolby Laboratories Licensing Corporation, San Francisco, CA (US)

(72) Inventor: David McGrath, Rose Bay (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/584,290

(22) Filed: Feb. 22, 2024

(65) Prior Publication Data

US 2024/0282321 A1 Aug. 22, 2024

Related U.S. Application Data

(63) Continuation of application No. 17/771,877, filed as application No. PCT/US2020/057885 on Oct. 29, 2020, now Pat. No. 11,942,097.

(Continued)

(51) Int. Cl.
*G10L 19/008* (2013.01)
*G10L 19/02* (2013.01)

(52) U.S. Cl.
CPC .................................. *G10L 19/008* (2013.01)

(58) Field of Classification Search
CPC .......................... G10L 19/008; G10L 19/0204

(Continued)

(56) References Cited

U.S. PATENT DOCUMENTS 9,299,353 B2 3/2016 Sole
9,460,729 B2 10/2016 Dickins (Continued)

FOREIGN PATENT DOCUMENTS

CN 105659319 A 6/2016
CN 106463125 A 2/2017

(Continued)

OTHER PUBLICATIONS

Zotter, F. et al."Ambisonics" A Practical 3D Audio Theory for Recording, Studio Production, Sound Reinforcement and Virtual Reality, Spring Topics in Signal Processing, Springer Nature Switzerland, May 14, 2019.

(Continued)

*Primary Examiner* — Thjuan K Addy

(57) ABSTRACT

Spatial audio signals are processed to generate a compressed representation of the spatial audio signal. Methods include analyzing the spatial audio signal to determine directions of arrival for one or more audio elements; for at least one frequency subband, determining respective indications of signal power associated with the directions of arrival; generating metadata including direction information that includes indications of the directions of arrival of the audio elements, and energy information that includes respective indications of signal power; generating a channel-based audio signal with a predefined number of channels based on the spatial audio signal; and outputting, as the compressed representation, the channel-based audio signal and the metadata. The compressed representation of a spatial audio signal can be further processed to generate a reconstructed representation of the spatial audio signal.

1 Claim, 8 Drawing Sheets

Related U.S. Application Data

(60) Provisional application No. 63/086,465, filed on Oct. 1, 2020, provisional application No. 62/927,790, filed on Oct. 30, 2019.

(58) Field of Classification Search
USPC .............................. 381/22, 1, 12, 19, 20, 21
See application file for complete search history.

(56) References Cited

U.S. PATENT DOCUMENTS

| | | | | |
|---|---|---|---|---|
| 9,653,086 | B2 | 5/2017 | Peters | |
| 9,654,644 | B2 | 5/2017 | Spittle | |
| 10,057,708 | B2 | 8/2018 | Robinson | |
| 10,107,887 | B2 | 10/2018 | Kim | |
| 10,109,282 | B2 | 10/2018 | Del Galdo | |
| 10,254,383 | B2 | 4/2019 | Bradley | |
| 11,019,449 | B2 | 5/2021 | Kim | |
| 2007/0269063 | A1 | 11/2007 | Goodwin | |
| 2014/0270184 | A1 | 9/2014 | Beaton | |
| 2017/0180907 | A1 | 6/2017 | Kuhr | |
| 2018/0359596 | A1 | 12/2018 | Breebaart | |
| 2019/0246203 | A1* | 8/2019 | Elko | H04R 1/406 |
| 2020/0058310 | A1* | 2/2020 | Goodwin | G10L 19/00 |

FOREIGN PATENT DOCUMENTS

| | | | |
|---|---|---|---|
| CN | 109564760 | A | 4/2019 |
| GB | 2571949 | A | 9/2019 |
| JP | 2015509212 | A | 3/2015 |
| JP | 2018511974 | A | 4/2018 |
| RU | 2704266 | C2 | 10/2019 |
| WO | 2019086757 | A1 | 5/2019 |
| WO | 2019097017 | A | 5/2019 |

OTHER PUBLICATIONS

"Information technology—High efficiency coding and media delivery in heterogeneous environments—Part 3: 3D audio", ISO/IEC 23008-3:2015, IEC, 3, Rue De Varembe, PO Box 131, CH-1211 Geneva 20, Switzerland, Oct. 16, 2015 (Oct. 16, 2015), pp. 1-428.

* cited by examiner

MULTICHANNEL AUDIO ENCODE AND DECODE USING DIRECTIONAL METADATA

CROSS-REFERENCE TO RELATED APPLICATIONS

This application is a continuation of U.S. patent application Ser. No. 17/771,877, filed Apr. 26, 2022, which is a U.S. National Stage application under U.S.C. 371 of International Application No. PCT/US2020/057885, filed on Oct. 29, 2020, which claims priority to U.S. Provisional Patent Application No. 62/927,790, filed Oct. 30, 2019 and U.S. Provisional Patent Application No. 63/086,465, filed Oct. 1, 2020, each of which is hereby incorporated by reference in its entirety.

TECHNICAL FIELD

The present disclosure generally relates to audio signal processing. In particular, the present disclosure relates to methods of processing a spatial audio signal (spatial audio scene) for generating a compressed representation of the spatial audio signal and to methods of processing a compressed representation of a spatial audio signal for generating a reconstructed representation of the spatial audio signal.

BACKGROUND

Human hearing enables listeners to perceive their environment in the form of a spatial audio scene—whereby the term "spatial audio scene" is used here to refer to the acoustic environment around a listener, or the perceived acoustic environment in the mind of the listener.

While the human experience is attached to spatial audio scenes, the art of audio recording and reproduction involves the capture, manipulation, transmission and playback of audio signals, or audio channels. The term "audio stream" is used to refer to a collection of one or more audio signals, particularly where the audio stream is intended to represent a spatial audio scene.

An audio stream may be played back to a listener, via electro-acoustic transducers or by other means, to provide one or more listeners with a listening experience in the form of a spatial audio scene. It is commonly a goal of audio recording practitioners and audio artists to create audio streams that are intended to provide a listener with the experience of a specific spatial audio scene.

An audio stream may be accompanied by associated data, referred to as metadata, that assists in the playback process. The accompanied metadata may include time-varying information that may be used to affect modifications in the processing that is applied during the playback process.

In the following, the term "captured audio experience" may be used to refer to an audio stream plus any associated metadata.

In some applications, the metadata consists solely of data indicative of the intended loudspeaker arrangement for playback. Often, this metadata is omitted, on the assumption that the playback speaker arrangement is standardized. In this case, the captured audio experience consists solely of an audio stream. An example of one such captured audio experience is a 2-channel audio stream, recorded on a compact disc, where the intended playback system is assumed to be in the form of two loudspeakers arranged in front of the listener.

Alternatively, a captured audio experience in the form of a scene-based multichannel audio signal may be intended for presentation to a listener by processing the audio signals, via a mixing matrix, so as to generate a set of speaker signals, each of which may be subsequently played back to a respective loudspeaker, wherein the loudspeakers may be arbitrarily arranged spatially around the listener. In this example, the mixing matrix may be generated based on prior knowledge of the scene-based format and the playback speaker arrangement.

An example of a scene-based format is Higher Order Ambisonics (HOA), and an example method for computing suitable mixing matrices is given in "Ambisonics", Franz Zotter and Matthias Frank, ISBN: 978-3-030-17206-0, Chapter 3, which is hereby incorporated by reference.

Typically, such scene-based formats include a large number of channels or audio objects, which leads to comparatively high bandwidth or storage requirements when transmitting or storing spatial audio signals in these formats.

Thus, there is a need for compact representations of spatial audio signals representing spatial audio scenes. This applies to both channel-based and object-based spatial audio signals.

SUMMARY

The present disclosure proposes methods of processing a spatial audio signal for generating a compressed representation of the spatial audio signal, methods of processing a compressed representation of a spatial audio signal for generating a reconstructed representation of the spatial audio signal, corresponding apparatus, programs, and computer-readable storage media.

One aspect of the disclosure relates to a method of processing a spatial audio signal for generating a compressed representation of the spatial audio signal. The spatial audio signal may be a multichannel signal or an object-based signal, for example. The compressed representation may be a compact or size-reduced representation. The method may include analyzing the spatial audio signal to determine directions of arrival for one or more audio elements in an audio scene (spatial audio scene) represented by the spatial audio signal. The audio elements may be dominant audio elements. The (dominant) audio elements may relate to (dominant) acoustic objects, (dominant) sound sources, or (dominant) acoustic components in the audio scene, for example. The one or more audio elements may include between one and ten audio elements, such as four audio elements, for example. The directions of arrival may correspond to locations on a unit sphere indicating the perceived locations of the audio elements. The method may further include, for at least one frequency subband (e.g., for all frequency subbands) of the spatial audio signal, determining respective indications of signal power associated with the determined directions of arrival. The method may further include generating metadata including direction information and energy information, with the direction information including indications of the determined directions of arrival of the one or more audio elements and the energy information including respective indications of signal power associated with the determined directions of arrival. The method may further include generating a channel-based audio signal with a predefined number of channels based on the spatial audio signal. The channel-based audio signal may be referred to as an audio mixture signal or audio mixture stream. It is understood that the number of channels of the channel-based audio signal may be smaller than the number of channels or the number of objects of the spatial audio signal. The method may yet further include outputting, as the compressed representation of the spatial audio signal, the channel-based audio signal and the metadata. The metadata may relate to a metadata stream.

Thereby, a compressed representation of a spatial audio signal can be generated that includes only a limited number of channels. Still, by appropriate use of the direction information and energy information, a decoder can generate a reconstructed version of the original spatial audio signal that is a very good approximation of the original spatial audio signal as far as the representation of the original spatial audio scene is concerned.

In some embodiments, analyzing the spatial audio signal may be based on a plurality of frequency subbands of the spatial audio signal. For example, the analysis may be based on the full frequency range of the spatial audio signal (i.e., the full signal). That is, the analysis may be based on all frequency subbands.

In some embodiments, analyzing the spatial audio signal may involve applying scene analysis to the spatial audio signal. Thereby, the (directions of) the dominant audio elements in the audio scene can be determined in a reliable and efficient manner.

In some embodiments, the spatial audio signal may be a multichannel audio signal. Alternatively, the spatial audio signal may be an object-based audio signal. In this case, the method may further include converting the object-based audio signal to a multichannel audio signal prior to applying the scene analysis. This allows to meaningfully apply scene analysis tools to the audio signal.

In some embodiments, an indication of signal power associated with a given direction of arrival may relate to a fraction of signal power in the frequency subband for the given direction of arrival in relation to the total signal power in the frequency subband.

In some embodiments, the indications of signal power may be determined for each of a plurality of frequency subbands. In this case, they may relate, for a given direction of arrival and a given frequency subband, to a fraction of signal power in the given frequency subband for the given direction of arrival in relation to the total signal power in the given frequency subband. Notably, the indications of signal power may be determined in a per-subband manner, whereas the determination of the (dominant) directions of arrival may be performed on the full signal (i.e., based on all frequency subbands).

In some embodiments, analyzing the spatial audio signal, determining respective indications of signal power, and generating the channel-based audio signal may be performed on a per-time-segment basis. Accordingly, the compressed representation may be generated and output for each of a plurality of time segments, with a downmixed audio signal and metadata (metadata block) for each time segment. Alternatively or additionally, analyzing the spatial audio signal, determining respective indications of signal power, and generating the channel-based audio signal may be performed based on a time-frequency representation of the spatial audio signal. For example, the aforementioned steps may be performed based on a discrete Fourier transform (such as a STFT, for example) of the spatial audio signal. That is, for each time segment (time block), the aforementioned steps may be performed based on the time-frequency bins (FFT bins) of the spatial audio signal, i.e., on the Fourier coefficients of the spatial audio signal.

In some embodiments, the spatial audio signal may be an object-based audio signal that includes a plurality of audio objects and associated direction vectors. Then, the method may further include generating the multichannel audio signal by panning the audio objects to a predefined set of audio channels. Therein, each audio object may be panned to the predefined set of audio channels in accordance with its direction vector. Further, the channel-based audio signal may be a downmix signal generated by applying a downmix operation to the multichannel audio signal. The multichannel audio signal may be a Higher Order Ambisonics signal, for example.

In some embodiments, the spatial audio signal may be a multichannel audio signal. Then, the channel-based audio signal may be a downmix signal generated by applying a downmix operation to the multichannel audio signal.

Another aspect of the disclosure relates to a method of processing a compressed representation of a spatial audio signal for generating a reconstructed representation of the spatial audio signal. The compressed representation may include a channel-based audio signal with a predefined number of channels and metadata. The metadata may include direction information and energy information. The direction information may include indications of directions of arrival of one or more audio elements in an audio scene (spatial audio scene). The energy information may include, for at least one frequency subband, respective indications of signal power associated with the directions of arrival. The method may include generating audio signals of the one or more audio elements based on the channel-based audio signal, the direction information, and the energy information. The method may further include generating a residual audio signal from which the one or more audio elements are substantially absent, based on the channel-based audio signal, the direction information, and the energy information. The residual signal may be represented in the same audio format as the channel-based audio signal, e.g., may have the same number of channels.

In some embodiments, an indication of signal power associated with a given direction of arrival may relate to a fraction of signal power in the frequency subband for the given direction of arrival in relation to the total signal power in the frequency subband.

In some embodiments, the energy information may include indications of signal power for each of a plurality of frequency subbands. Then, an indication of signal power may relate, for a given direction of arrival and a given frequency subband, to a fraction of signal power in the given frequency subband for the given direction of arrival in relation to the total signal power in the given frequency subband.

In some embodiments, the method may further include panning the audio signals of the one or more audio elements to a set of channels of an output audio format. The method may yet further include generating a reconstructed multichannel audio signal in the output audio format based on the panned one or more audio elements and the residual signal. The output audio format may relate to an output representation, for example, such as HOA or any other suitable multichannel format. Generating the reconstructed multichannel audio signal may include upmixing the residual signal to the set of channels of the output audio format. Generating the reconstructed multichannel audio signal may further include adding the panned one or more audio elements and the upmixed residual signal.

In some embodiments, generating audio signals of the one or more audio elements may include determining coefficients of an inverse mixing matrix M for mapping the channel-based audio signal to an intermediate representation including the residual audio signal and the audio signals of the one or more audio elements, based on the direction information and the energy information. The intermediate representation may also be referred to as a separated or separable representation, or a hybrid representation.

In some embodiments, determining the coefficients of the inverse mixing matrix M may include determining, for each of the one or more audio elements, a panning vector $Pan_{down}$(dir) for panning the audio element to the channels of the channel-based audio signal, based on the direction of arrival dir of the audio element. Said determining the coefficients of the inverse mixing matrix M may further include determining a mixing matrix E that would be used for mapping the residual audio signal and the audio signals of the one or more audio elements to the channels of the channel-based audio signal, based on the determined panning vectors. Said determining the coefficients of the inverse mixing matrix M may further include determining a covariance matrix S for the intermediate representation based on the energy information. Determination of the covariance matrix S may be further based on the determined panning vectors $Pan_{down}$. Said determining the coefficients of the inverse mixing matrix M may yet further include determining the coefficients of the inverse mixing matrix M based on the mixing matrix E and the covariance matrix S.

In some embodiments, the mixing matrix E may be determined according to $E=(I_N|Pan_{down}(dir_1)| \ldots |Pan_{down}(dir_P))$. Here, $I_N$ may be an N×N identity matrix, with N indicating the number of channels of the channel-based signal, $Pan_{down}(dir_p)$ may be the panning vector for the p-th audio element with associated direction of arrival $dir_p$ that would pan (e.g., map) the p-th audio element to the N channels of the channel-based signal, with $p=1, \ldots, P$ indicating a respective one among the one or more audio elements and P indicating the total number of the one or more audio elements. Accordingly, the matrix E may be a N×P matrix. The matrix E may be determined for each of a plurality of time segments k. In that case, the matrix E and the directions of arrival $dir_p$ would have an index k indicating the time segment, e.g., $E_k=(I_N|Pan_{down}(dir_{k,1})| \ldots |Pan_{down}(dir_{k,P}))$. Even though the proposed method may operate in a band-wise manner, the matrix E may be the same for all frequency subbands.

In some embodiments, the covariance matrix S may be determined as a diagonal matrix according to $\{S\}_{n,n}=rms(Pan_{down})_n(1-\Sigma_{p=1}^{P}e_p)$ for $1 \le n \le N$, and $\{S\}_{N+p,N+p}=e_p$ for $1 \le p \le P$. Here, $e_p$ may be the signal power associated with the direction of arrival of the p-th audio element. The matrix S may be determined for each of a plurality of time segments k, and/or for each of a plurality of frequency subbands b. In that case, the matrix S and the signal powers $e_p$ would have an index k indicating the time segment and/or an index b indicating the frequency subband, e.g., $\{S_{k,b}\}=rms(Pan_{down})_n(1-\Sigma_{p=1}^{P}e_{k,p,b})$ for $1 \le n \le N$, and $\{S_{k,b}\}_{N+p,N+p}=e_{k,p,b}$ for $1 \le p \le P$.

In some embodiments, determining the coefficients of the inverse mixing matrix M based on the mixing matrix E and the covariance matrix S may involve determining a pseudo inverse based on the mixing matrix E and the covariance matrix S.

In some embodiments, the inverse mixing matrix M may be determined according to $M=S \times E^* \times (E \times S \times E^*)^{-1}$. Here, "×" indicates the matrix product and "*" indicates the conjugate transpose of a matrix. The inverse mixing matrix M may be determined for each of a plurality of time segments k, and/or for each of a plurality of frequency subbands b. In that case, the matrices M and S would have an index k indicating the time segment and/or an index b indicating the frequency subband, and the matrix E would have an index k indicating the time segment, e.g., $M_{k,b}=S_{k,b} \times E_k^* \times (E_k \times S_{k,b} \times E^*)^{-1}$.

In some embodiments, the channel-based audio signal may be a first-order Ambisonics signal.

Another aspect relates to an apparatus including a processor and a memory coupled to the processor, wherein the processor is adapted to carry out all steps of the methods according to any one of the aforementioned aspects and embodiments.

Another aspect of the disclosure relates to a program including instructions that, when executed by a processor, cause the processor to carry out all steps of the aforementioned methods.

Yet another aspect of the disclosure relates to a computer-readable storage medium storing the aforementioned program.

Further embodiments of the disclosure include an efficient method for representing a spatial audio scene in the form of an audio mixture stream and a direction metadata stream, where the direction metadata stream includes data indicative of the location of directional sonic elements in the spatial audio scene and data indicative of the power of each directional sonic element, in a number of subbands, relative to the total power of the spatial audio scene in that subband. Yet further embodiments relate to methods for determining the direction metadata stream from an input spatial audio scene, and methods for creating a reconstituted audio scene from a direction metadata stream and associated audio mixture stream.

In some embodiments, a method is employed for representing a spatial audio scene in a more compact form as a compact spatial audio scene including an audio mixture stream and a direction metadata stream, wherein said audio mixture stream is comprised of one or more audio signals, and wherein said direction metadata stream is comprised of a time series of direction metadata blocks with each of said direction metadata blocks being associated with a corresponding time segment in said audio signals, and wherein said spatial audio scene includes one or more directional sonic elements that are each associated with a respective direction of arrival, and wherein each of said direction metadata blocks contains:

- direction information indicative of said directions of arrival for each of said directional sonic elements, and
- Energy Band Fraction Information indicative of the energy in each of said directional sonic elements, relative to the energy in the said corresponding time segment in said audio signals, for each of said directional sonic elements and for each of a set of two or more subbands In some embodiments, a method is employed for processing a compact spatial audio scene including an audio mixture stream and a direction metadata stream, to produce a separated spatial audio stream including a set of one or more audio object signals and a residual stream, wherein said audio mixture stream is comprised of one or more audio signals, and wherein said direction metadata stream is comprised of a time series of direction metadata blocks with each of said direction metadata blocks being associated with a corresponding time segment in said audio signals, wherein for each of a plurality of subbands, the method includes:

- determining the coefficients of a de-mixing matrix (inverse mixing matrix) from direction information and Energy Band Fraction information contained in the direction metadata stream, and mixing, using said de-mixing matrix, the said audio signals to produce the said separated spatial audio stream.

In some embodiments, a method is employed for processing a spatial audio scene to produce a compact spatial audio scene including an audio mixture stream and a direction metadata stream, wherein said spatial audio scene includes one or more directional sonic elements that are each associated with a respective direction of arrival, and wherein said direction metadata stream is comprised of a time series of direction metadata blocks with each of said direction metadata blocks being associated with a corresponding time segment in said audio signals, said method including:

a step of determining the said direction of arrival for one or more of said directional sonic elements, from an analysis of said spatial audio scene, a step of determining what fraction of the total energy in the said spatial scene is contributed by the energy in each of said directional sonic elements, and a step of processing said spatial audio scene to produce said audio mixture stream.

It is understood that the aforementioned steps may be implemented by suitable means or units, which in turn may be implemented by one or more computer processors, for example.

It will also be appreciated that apparatus features and method steps may be interchanged in many ways. In particular, the details of the disclosed method(s) can be realized by the corresponding apparatus, and vice versa, as the skilled person will appreciate. Moreover, any of the above statements made with respect to the method(s) are understood to likewise apply to the corresponding apparatus, and vice versa.

BRIEF DESCRIPTION OF THE DRAWINGS

Example embodiments of the disclosure are illustrated by way of example in the accompanying drawings, in which like reference numbers indicate the same or similar elements and in which.

DETAILED DESCRIPTION

Figure 1:
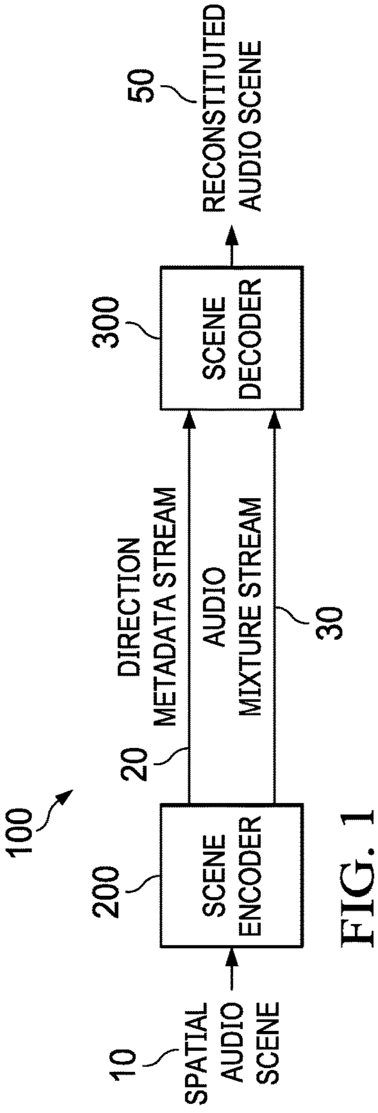
FIG. 1 schematically illustrates an example of an arrangement of an encoder generating a compressed representation of a spatial audio scene and a corresponding decoder for generating a reconstituted audio scene from the compressed representation, according to embodiments of the disclosure, FIG. 2 schematically illustrates another example of an arrangement of a encoder generating a compressed representation of a spatial audio scene and a corresponding decoder for generating a reconstituted audio scene from the compressed representation, according to embodiments of the disclosure, FIG. 3 schematically illustrates an example of generating a compressed representation of a spatial audio scene, according to embodiments of the disclosure, FIG. 4 schematically illustrates an example of decoding a compressed representation of a spatial audio scene to form a reconstituted audio scene, according to embodiments of the disclosure.

Generally, the present disclosure relates to enabling storage and/or transmission, using a reduced amount of data, of a spatial audio scene.

Concepts of audio processing that may be used in the context of the present disclosure will be described next.

Panning Functions

A multichannel audio signal (or audio stream) may be formed by panning individual sonic elements (or audio elements, audio objects) according to a linear mixing law. For example, if a set of R audio objects are represented by R signals, $\{o_r(t)\colon 1 \le r \le R\}$, then a multichannel panned mixture, $\{z_n(t)\colon 1 \le n \le N\}$ may be formed by $$\begin{pmatrix} z_1(t) \\ z_2(t) \\ \vdots \\ z_N(t) \end{pmatrix} = \sum_{r=1}^{R} Pan(\theta_r) o_r(t) \tag{1}$$

The panning function, $Pan(\theta_r)$, represents a column vector containing N scale-factors (panning gains) indicative of the gains that are used to mix the object signal, $o_r(t)$, to form the multichannel output, and where $\theta_r$ is indicative of the location of the respective object.

One possible panning function is a first-order Ambisonics (FOA) panner. An example of an FOA panning function is given by $$\underset{FOA}{Pan}(x, y, z) = \begin{pmatrix} 1 \\ y \\ z \\ x \end{pmatrix} \tag{2}$$

An alternative panning function is a third-order Ambisonics panner (3OA). An example of a 3OA panning function is given by $$\underset{3OA}{Pan}(x, y, z) = \begin{pmatrix} 1 \\ y \\ z \\ x \\ \sqrt{3}xy \\ \sqrt{3}yz \\ \frac{1}{2}(2z^2 - x^2 - y^2) \\ \sqrt{3}xz \\ \frac{\sqrt{3}}{2}(x^2 - y^2) \\ \frac{\sqrt{10}}{4}y(3x^2 - y^2) \\ \sqrt{15}xyz \\ \frac{\sqrt{6}}{4}y(4z^2 - x^2 - y^2) \\ \frac{1}{2}z(2z^2 - 3x^2 - 3y^2) \\ \frac{\sqrt{6}}{4}x(4z^2 - x^2 - y^2) \\ \frac{\sqrt{15}}{2}z(x^2 - y^2) \\ \frac{\sqrt{10}}{4}x(x^2 - 3y^2) \end{pmatrix} \tag{3}$$

It is understood that the present disclosure is not limited to FOA or HOA panning functions, and that use of other panning functions may be considered, as the skilled person will appreciate.

Short-Term Fourier Transform

An audio stream, consisting of one or more audio signals, may be converted into short-term Fourier transform (STFT) form, for example. To this end, a discrete Fourier transform may be applied to (optionally windowed) time segments of the audio signals (e.g., channels, audio object signals) of the audio stream. This process, applied to an audio signal x(t), may be expressed as follows $$X_{c,k}(f) = STFT\{x_c(t)\} \tag{4}$$

It is understood that the STFT is an example of a time-frequency transform and that the present disclosure shall not be limited to STFTs.

In Equation (4), the variable $X_{c,k}(f)$ indicates the short-term Fourier transform of channel c ($1 \le c \le NumChans$), for audio time segment k ($k \in \mathbb{Z}$), at frequency bins f ($1 \le f \le F$), where F indicates the number of frequency bins produced by the discrete Fourier transform. It will be appreciated that the terminology used here is by way of example, and that specific implementation details of various STFT methods (including various window functions) may be known in the art. Audio time segment k may be defined for example as a range of audio samples centered around $t = k \times stride + constant$, so that time segments are uniformly spaced in time, with a spacing equal to stride.

The numeric values of the STFT (such as $X_{c,k}(1)$, $X_{c,k}(2)$, . . . , $X_{c,k}(F)$) may be referred to as FFT bins.

Further, the STFT form may be converted into an audio stream. The resulting audio stream may be an approximation to the original input and may be given by $$x'_c(t) = STFT^{-1}\{X_{c,k}(f)\} \tag{5}$$

-continued $$\approx x_c(t)$$

Frequency-Banded Analysis

Characteristic data may be formed from an audio stream where the characteristic data is associated with a number of frequency bands (frequency subbands), where a band (subband) is defined by a region of the frequency range.

By way example, the signal power in channel c of a stream, in frequency band b (where the number of bands is B and $1 \le b \le B$), where band b spans FFT bins $f_{min} \le f \le f_{max}$, may be computed according to $$\text{power}_{c,b,k} = \sum_{f=f_{min}}^{f_{max}} |X_{c,k}(f)|^2 \tag{6}$$

According to a more general example, the frequency band b may be defined by a weighting vector, $FR_b(f)$, that assigns weights to each frequency bin, so that an alternative calculation of the power in a band may be given by $$\text{power}_{c,b,k} = \sum_{f=1}^{F} FR_b(f)|X_{c,k}(f)|^2 \tag{7}$$

In a further generalization of Equation (7), the STFT of a stream that is composed of C audio signals may be processed to produce the covariance in a number of bands, where the covariance, $R_{b,k}$ is a C×C matrix, and where element $\{R_{b,k}\}_{i,j}$ is computed according to $$\{R_{b,k}\}_{i,j} = \sum_{f=1}^{F} FR_b(f)X_{i,k}(f)\overline{X_{j,k}(f)} \tag{8}$$

where $\overline{X_{j,k}(f)}$ represents the complex conjugate of $X_{j,k}(f)$.

In another example, band-pass filters may be employed to form filtered signals representative of the original audio stream in frequency bands according to the band-pass filter responses. For example, an audio signal $x_c(t)$ may be filtered to produce $x'_{c,b}(t)$, representing a signal with energy predominantly derived from band b of $x_c(t)$, and hence an alternative method for computing the covariance of a stream in band b for time block k (corresponding to time samples $t_{min} \le t \le t_{max}$) may be expressed by $$\{R_{b,k}\}_{i,j} = \sum_{t=t_{min}}^{t_{max}} x'_{i,b}(t)x'_{j,b}(t) \tag{9}$$

Frequency-Banded Mixing

An audio stream composed of N channels may be processed to produce an audio stream composed of M channels according to an M×N linear mixing matrix, Q, so that $$y_m(t) = \sum_{n=1}^{N} Q_{m,n}x_n(t) \tag{10}$$

which may be written in matrix form as $$\hat{y}(t) = Q \times \hat{x}(t) \tag{11}$$

where $\hat{x}(t)$ refers to the column-vector formed from the N elements: $x_1(t)$, $x_2(t)$, . . . , $x_N(t)$.

Further, an alternative mixing process may be implemented in the STFT domain, wherein the matrix, Q, may take on different values in each time block, k, and in each frequency band, b. In this case, the processing may be considered to be approximately given by $$Y_{m,k}(f) = \sum_{b=1}^{B} \sum_{n=1}^{N} FR_b(f) Q_{b,k_{m,n}} X_{n,k}(f) \tag{12}$$

or, in matrix form $$\hat{Y}_k(f) = \sum_{b=1}^{B} FR_b(f) \left(Q_{b,k} \times \hat{X}_k(f)\right) \tag{13}$$

It will be appreciated that alternative methods may be employed to produce an equivalent behavior to the processing described in Equation (13).

Example Implementations

Next, example implementations of methods and apparatus according to embodiments of the disclosure will be described in more detail.

Broadly speaking, methods according to embodiments of the disclosure represent a spatial audio scene in the form of an audio mixture stream and a direction metadata stream, where the direction metadata stream includes data indicative of the location of directional sonic elements in the spatial audio scene and data indicative of the power of each directional sonic element, in a number of subbands, relative to the total power of the spatial audio scene in that subband. Further methods according to embodiments of the disclosure relate to determining the direction metadata stream from an input spatial audio scene, and to creating a reconstituted (e.g., reconstructed) audio scene from a direction metadata stream and associated audio mixture stream.

Examples of methods according to embodiments of the disclosure are efficient (e.g., in terms of reduced data for storage or transmission) in representing a spatial sound scene. The spatial audio scene may be represented by a spatial audio signal. Said methods may be implemented by defining a storage or transmission format (e.g., the Compact Spatial Audio Stream) that consists of an audio mixture stream and a metadata stream (e.g., direction metadata stream).

The audio mixture stream comprises a number of audio signals that convey a reduced representation of the spatial sound scene. As such, the audio mixture stream may relate to a channel-based audio signal with a predefined number of channels. It is understood that the number of channels of the channel-based audio signal is smaller than the number of channels or the number of audio objects of the spatial audio signal. For example, the channel-based audio signal may be a first-order Ambisonics audio signal. In other words, the Compact Spatial Audio Stream may include an audio mixture stream in the form of a first-order Ambisonics representation of the soundfield.

The (direction) metadata stream comprises metadata that defines spatial properties of the spatial sound scene. Direction metadata may consist of a sequence of direction metadata blocks, wherein each direction metadata block contains metadata that indicates properties of the spatial sound scene in a corresponding time segment in the audio mixture stream.

In general, the metadata includes direction information and energy information. The direction information comprises indications of directions of arrival of one or more (dominant) audio elements in the audio scene. The energy information comprises, for each direction of arrival, an indication of signal power associated with the determined directions of arrival. In some implementations, the indications of signal power may be provided for one, some, or each of a plurality of bands (frequency subbands). Moreover, the metadata may be provided for each of a plurality of consecutive time segments, such as in the form of metadata blocks, for example.

In one example, the metadata (direction metadata) includes metadata that indicates properties of the spatial sound scene over a number of frequency bands, where the metadata defines:

- one or more directions (e.g., directions of arrival) indicative of the location of audio objects (audio elements) in the spatial sound scene, and
- a fraction of energy (or signal power), in each frequency band, that is attributed to the respective audio object (e.g., attributed to the respective direction).

Details on the determination of the direction information and the energy information will be provided below.

FIG. 1 schematically shows an example of an arrangement employing embodiments of the disclosure. Specifically, the figure shows an arrangement 100 wherein a spatial audio scene 10 is input to a scene encoder 200 that generates an audio mixture stream 30 and a direction metadata stream 20. The spatial audio scene 10 may be represented by a spatial audio signal or spatial audio stream that is input to the scene encoder 200. The audio mixture stream 30 and the direction metadata stream 20 together form an example of a compact spatial audio scene, i.e., a compressed representation of the spatial audio scene 10 (or of the spatial audio signal).

The compressed representation, i.e., the mixture audio stream 30 and the direction metadata stream 20 are input to scene decoder 300 which produces a reconstructed audio scene 50. Audio elements that exist within the spatial audio scene 10 will be represented within the audio mixture stream 30 according to a mixture panning function.

Figure 2:
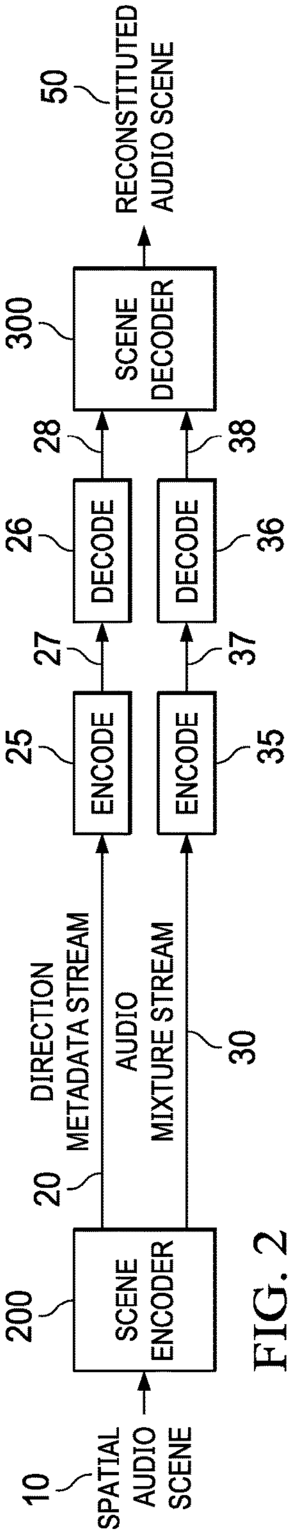

FIG. 2 schematically shows another example of an arrangement employing embodiments of the disclosure. Specifically, the figure shows an alternative arrangement 110 wherein the compact spatial audio scene, composed of audio mixture stream 30 and a direction metadata stream 20, is further encoded by providing the audio mixture stream 30 to audio encoder 35 to produce a reduced bit-rate encoded audio stream 37, and by providing the direction metadata stream 20 to a metadata encoder 25 to produce an encoded metadata stream 27. The reduced bit-rate encoded audio stream 37 and the encoded metadata stream 27 together form an encoded (reduced bit-rate encoded) spatial audio scene.

The encoded spatial audio scene may be recovered by first applying the reduced bit-rate encoded audio stream 37 and the encoded metadata stream 27 to respective decoders 36 and 26 to produce a recovered audio mixture stream 38 and a recovered direction metadata stream 28. The recovered streams 38, 28 may be identical to or approximately equal to the respective streams 30, 20. The recovered audio mixture stream 38 and the recovered direction metadata stream 28 may be decoded by decoder 300 to produce a reconstructed audio scene 50.

Figure 3:
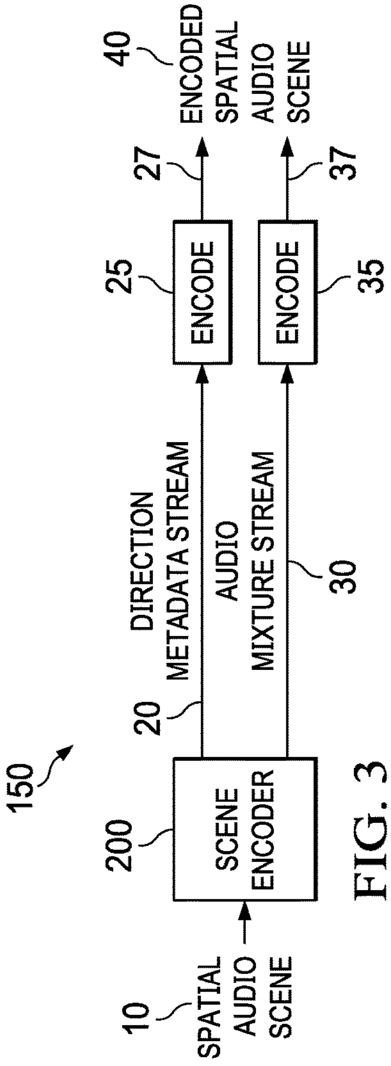

FIG. 3 schematically illustrates an example of an arrangement for generating a reduced bit-rate encoded audio stream and an encoded metadata stream from an input spatial audio scene. Specifically, the figure shows an arrangement 150 of scene encoder 200 providing a direction metadata stream 20 and audio mixture stream 30 to respective encoders 25, 35 to produce an encoded spatial audio scene 40 which includes reduced bit-rate encoded audio stream 37 and the encoded metadata stream 27. Encoded spatial audio stream 40 is preferably arranged to be suitable for storage and/or transmission with reduced data requirement, relative to the data required for storage/transmission of the original spatial audio scene.

Figure 4:
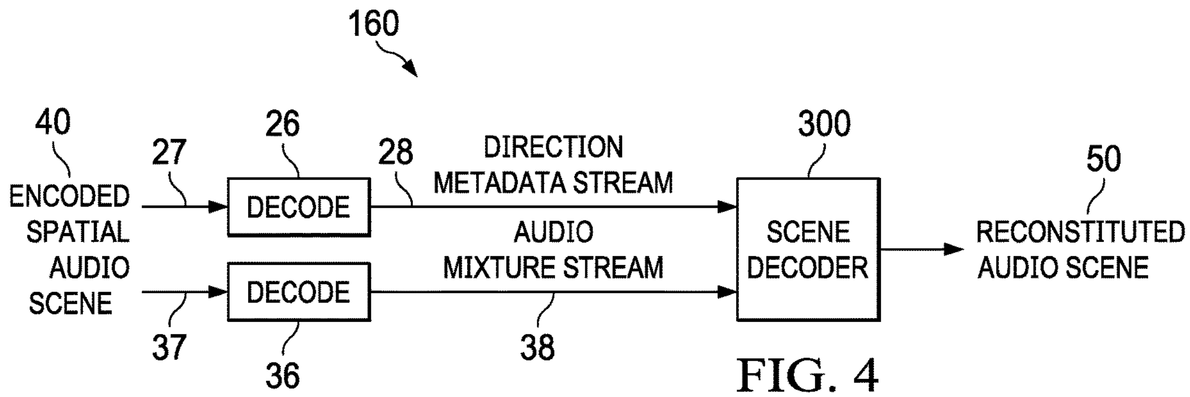

FIG. 4 schematically illustrates an example of an arrangement for generating a reconstructed spatial audio scene from the reduced bit-rate encoded audio stream and the encoded metadata stream. Specifically, the figure shows an arrangement 160 wherein an encoded spatial audio stream 40, composed of reduced bit-rate encoded audio stream 37 and encoded metadata stream 27, is provided as input to decoders 36, 26 to produce audio mixture stream 38 and direction metadata stream 28, respectively. Streams 38, 28 are then processed by scene decoder 300 to produce a reconstructed audio scene 50.

Details of generating the compact spatial audio scene, i.e., the compressed representation of the spatial audio scene (or of the spatial audio signal/spatial audio stream) will be described next.

Figure 5:
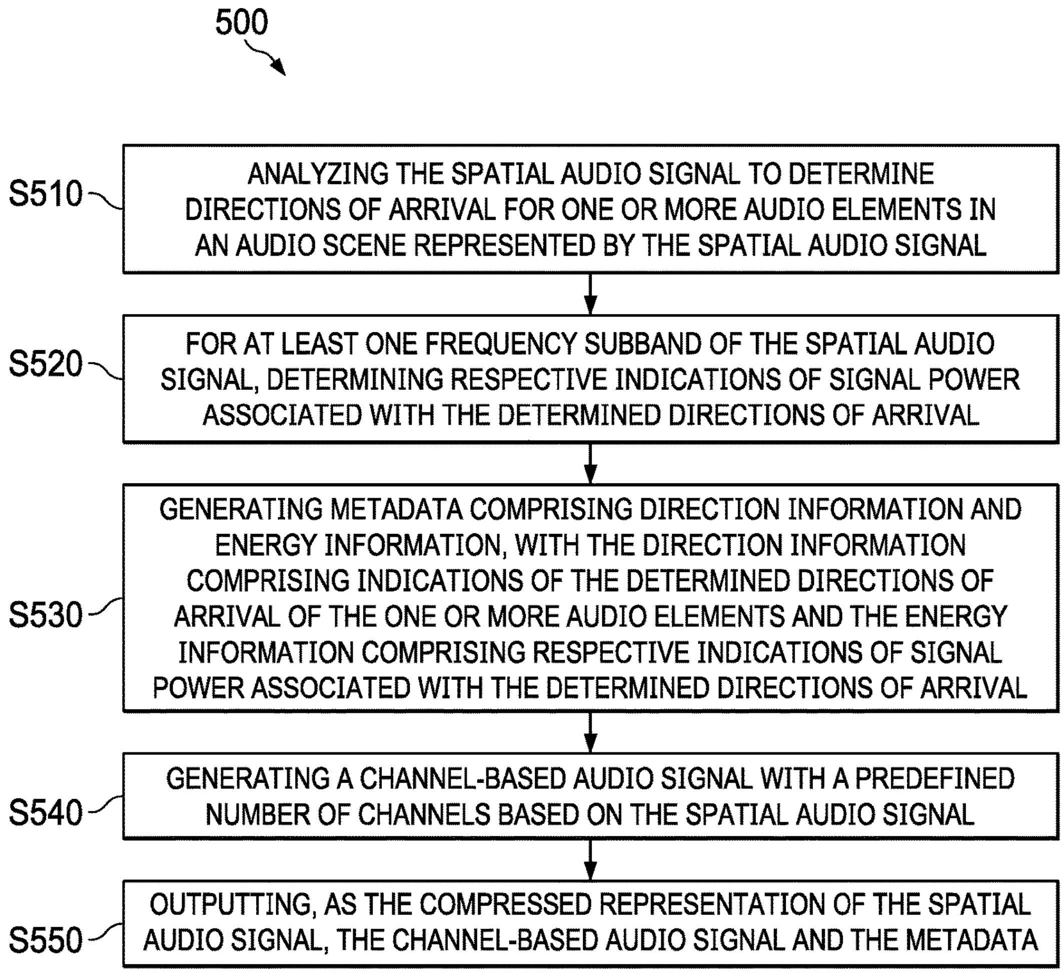
FIG. 5 and FIG. 6 are flowchart illustrating examples of methods of processing a spatial audio scene for generating a compressed representation of the spatial audio scene, according to embodiments of the disclosure, FIG. 7 to FIG. 11 schematically illustrate examples of details of generating a compressed representation of a spatial audio scene, according to embodiments of the disclosure, FIG. 12 schematically illustrates an example of details of decoding a compressed representation of a spatial audio scene to form a reconstituted audio scene, according to embodiments of the disclosure.

FIG. 5 is a flowchart of an example of a method 500 of processing a spatial audio signal for generating a compressed representation of the spatial audio signal. The method 500 comprises steps S510 through S550.

At step S510, the spatial audio signal is analyzed to determine directions of arrival for one or more audio elements (e.g., dominant audio elements) in an audio scene (spatial audio scene) represented by the spatial audio signal. The (dominant) audio elements may relate to (dominant) acoustic objects, (dominant) sound sources, or (dominant) acoustic components in the audio scene, for example. Analyzing the spatial audio signal may involve or may relate to applying scene analysis to the spatial audio signal. It is understood that a range of suitable scene analysis tools are known to the skilled person. The directions of arrival determined at this step may correspond to locations on a unit sphere indicating the (perceived) locations of the audio elements.

In line with the above description of frequency-banded analysis, analyzing the spatial audio signal at step S510 can be based on a plurality of frequency subbands of the spatial audio signal.

For example, the analysis may be based on the full frequency range of the spatial audio signal (i.e., the full signal). That is, the analysis may be based on all frequency subbands.

At step S520, respective indications of signal power associated with the determined directions of arrival are determined for at least one frequency subband of the spatial audio signal.

At step S530, metadata comprising direction information and energy information is generated. The direction information comprises indications of the determined directions of arrival of the one or more audio elements. The energy information comprises respective indications of signal power associated with the determined directions of arrival. The metadata generated at this step may relate to a metadata stream.

At step S540, a channel-based audio signal with a predefined number of channels is generated based on the spatial audio signal.

Finally, at step S550, the channel-based audio signal and the metadata are output as the compressed representation of the spatial audio signal.

It is understood that the above steps may be performed in any order or in parallel to each other, as long as the order of steps ensures that the necessary input for each step is available.

Typically, a spatial scene (or spatial audio signal) may be considered to be composed of a summation of acoustic signals that are incident on a listener from a set of directions, relative to the listening position. The spatial audio scene may therefore be modeled as a collection of R acoustic objects, where object r ($1 \le r \le R$) is associated with an audio signal $o_r(t)$ that is incident at the listening position from a direction of arrival defined by the direction vector $\theta_r$. The direction vector may also be a time-varying direction vector $\theta_r(t)$.

Hence, according to some implementations, the spatial audio signal (spatial audio stream) may be defined as an object-based spatial audio signal (object-based spatial audio scene), in the form of a set of audio signals and associated direction-vectors $$\text{Spatial Audio Scene (object-based)} = \{(o_r(t), \theta_r(t)) : 1 \le r \le R\} \quad (14)$$

Further, according to some implementations, the spatial audio signal (spatial audio stream) may be defined in terms of short-term Fourier transform signals, $O_{r,k}(f)$, according to Equation (4), and direction-vectors may be specified according to block-index, k, so that:

$$\text{Spatial Audio Scene } (obj\text{-based}) = \{(O_{r,k}(f), \theta_r(k)) : 1 \le r \le R\} \quad (15)$$

Alternatively, the spatial audio signal (spatial audio stream) may be represented in terms of a channel-based spatial audio signal (channel-based spatial audio scene). A channel based stream consists of a collection of audio signals, wherein each acoustic object from the spatial audio scene is mixed into the channels according to a panning function ($Pan(\theta)$), according to Equation (1). By way of example, a Q-channel channel-based spatial audio scene, $\{C_{q,k}(f): 1 \le q \le Q\}$, may be formed from an object-based spatial audio scene according to $$\text{Spatial Audio Scene (channel-based)} = \{C_{q,k}(f) : 1 \le q \le Q\} \quad (16)$$

$$\text{where} \begin{pmatrix} C_{1,k}(f) \\ C_{2,k}(f) \\ \vdots \\ C_{Q,k}(f) \end{pmatrix} = \sum_{r=1}^{R} Pan(\theta_r(k)) O_{r,k}(f)$$

It will be appreciated that many characteristics of a channel-based spatial audio scene are determined by the choice of the panning function, and in particular the length (Q) of the column-vector returned by the panning function will determine the number of audio channels contained in the channel-based spatial audio scene. Generally speaking, a higher-quality representation of a spatial audio scene may be realized by a channel-based spatial audio scene containing a larger number of channels.

As an example, at step S540 of the method 500 the spatial audio signal (spatial audio scene) may be processed to create a channel-based audio signal (channel-based stream) according to Equation (16). The panning function may be chosen so as to create a relatively low-resolution representation of the spatial audio scene. For instance, the panning function may be chosen to be the First Order Ambisonics (FOA) function, such as that defined in Equation (2). As such, the compressed representation may be a compact or size-reduced representation.

Figure 6:
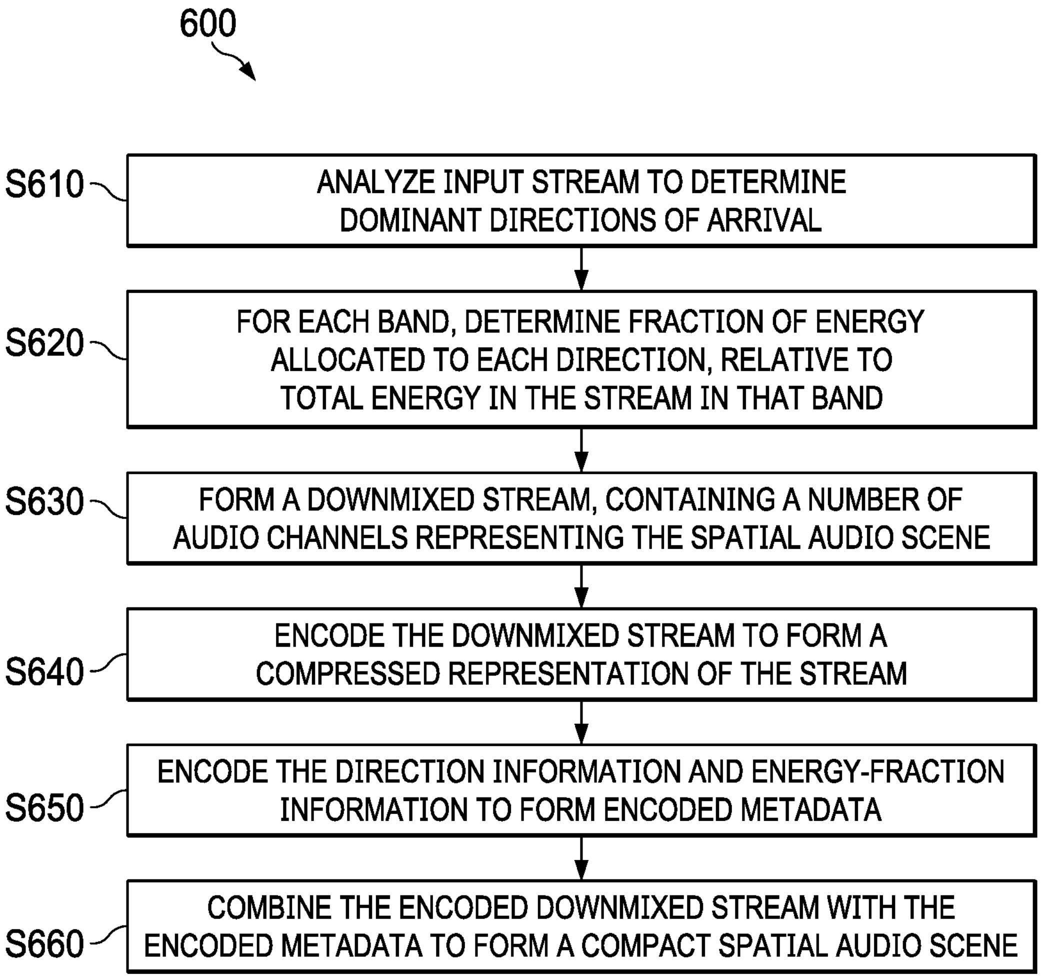

FIG. 6 is a flowchart providing another formulation of a method 600 of generating a compact representation of a spatial audio scene. The method 600 is provided with an input stream, in the form of a spatial audio scene or a scene-based stream, and produces a compact spatial audio scene as the compact representation. To his end, method 600 comprises steps S610 through S660. Therein, step S610 may be seen as corresponding to step S510, step 620 may be seen as corresponding to step S520, step S630 may be seen as corresponding to step S540, step S650 may be seen as corresponding to step S530, and step S660 may be seen as corresponding to step S550.

At step S610, the input stream is analyzed to determine dominant directions of arrival.

At step S620, for each band (frequency subband), a fraction of energy allocated to each direction is determined, relative to a total energy in the stream in that band.

At step S630, a downmix stream is formed, containing a number of audio channels representing the spatial audio scene.

At step S640, the downmixed stream is encoded to form a compressed representation of the stream.

At step S650, the direction information and energy-fraction information are encoded to form encoded metadata.

Finally, at step S660 the encoded downmixed stream is combined with the encoded metadata to form a compact spatial audio scene.

It is understood that the above steps may be performed in any order or in parallel to each other, as long as the order of steps ensures that the necessary input for each step is available.

FIG. 7 to FIG. 11 schematically illustrate examples of details of generating a compressed representation of a spatial audio scene, according to embodiments of the disclosure. It is understood that the specifics of, for example, analyzing the spatial audio signal for determining directions of arrival, determining indications of signal power associated with the determined directions of arrival, generating metadata comprising direction information and energy information, and/or generating the channel-based audio signal with a predefined number of channels as described below may be independent of the specific system arrangement and may apply to, for example, any of the arrangements shown in FIG. 7 to FIG. 11, or any suitable alternative arrangements.

Figure 7:
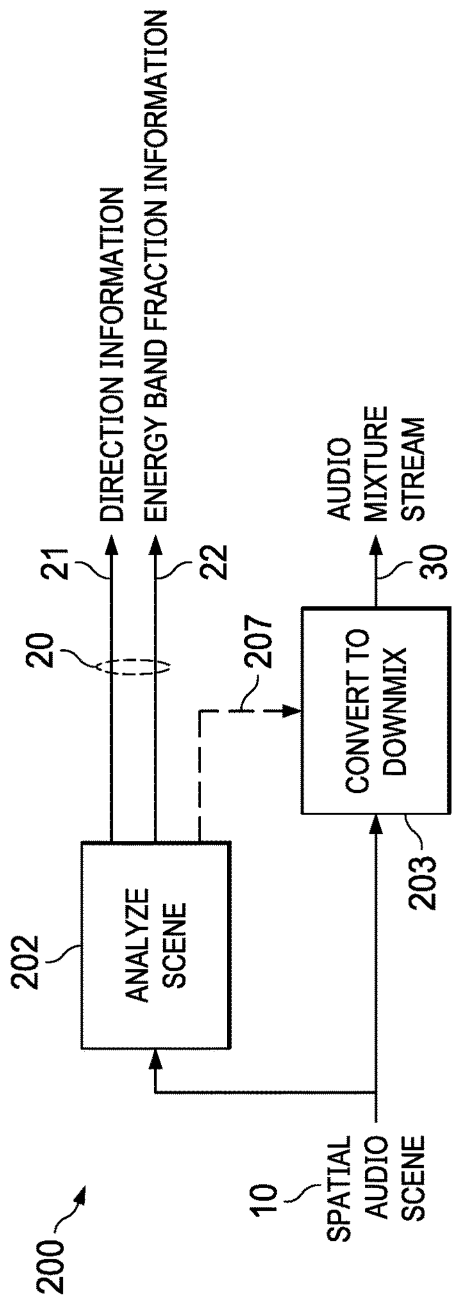

FIG. 7 schematically illustrates a first example of details of generating the compressed representation of the spatial audio scene. Specifically, FIG. 7 shows a scene encoder 200 in which a spatial audio scene 10 is processed by a downmix function 203 to produce an N-channel audio mixture stream 30, in accordance with, for example, steps S540 and S630. In some embodiments, the downmix function 203 may include the panning process according to Equation (1) or Equation (16), wherein a downmix panning function is chosen: Pan(θ)=Pan(θ). For example, a first order Ambisonics panner may be chosen as the downmix panning down function:

$$\underset{down}{Pan}(\theta) = \underset{FOA}{Pan}(\theta)$$

and hence N=4.

For each audio time segment, scene analysis 202 takes as input the spatial audio scene, and determines the directions of arrival of up to P dominant acoustic components within the spatial audio scene, in accordance with, for example, steps S510 and S610. Typical values for P are between 1 and 10, and a preferred value for P is P≈4. Accordingly, the one or more audio elements determined at step S510 may comprise between one and ten audio elements, such as four audio elements, for example.

Scene analysis 202 produces a metadata stream 20 composed of direction information 21 and energy band fraction information 22 (energy information). Optionally, scene analysis 202 may also provide coefficients 207 to the downmix function 203 to allow the downmix to be modified.

Without intended limitation, analyzing the spatial audio signal (e.g., at step S510), determining respective indications of signal power (e.g., at step S520), and generating the channel-based audio signal (e.g., at step S540) may be performed on a per-time-segment basis, in line with, for example, the above description of STFTs. This implies that the compressed representation will be generated and output for each of a plurality of time segments, with a downmixed audio signal and metadata (metadata block) for each time segment.

For each time segment, k, direction information 21 (e.g., embodied by the directions of arrival of the one or more audio elements) can take the form of P direction vectors, $\{dir_{k,p}: 1 \le p \le P\}$. Direction vector p indicates the direction associated with dominant object index p, and may be represented in terms of unit-vectors, $$dir_{k,p} = (x_{k,p}, y_{k,p}, z_{k,p}) \qquad (17)$$

$$\text{where: } x_{k,p}^2 + y_{k,p}^2 + z_{k,p}^2 = 1$$

or in terms of spherical coordinates, $$dir_{k,p} = (az_{k,p}, el_{k,p}) \qquad (18)$$

$$\text{where: } -180 \le az_{k,p} \le 180 \text{ and } -90 \le el_{k,p} \le 90$$

In some embodiments, the respective indications of signal power determined at step S520 take the form of a fraction of signal power. That is, an indication of signal power associated with a given direction of arrival in the frequency subband relates to a fraction of signal power in the frequency subband for the given direction of arrival in relation to the total signal power in the frequency subband.

Further, in some embodiments the indications of signal power are determined for each of a plurality of frequency subbands (i.e., in a per-subband manner). Then, they relate, for a given direction of arrival and a given frequency subband, to a fraction of signal power in the given frequency subband for the given direction of arrival in relation to the total signal power in the given frequency subband. Notably, even though the indications of signal power may be determined in a per-subband manner, the determination of the (dominant) directions of arrival may still be performed on the full signal (i.e., based on all frequency subbands).

Yet further, in some embodiments analyzing the spatial audio signal (e.g., at step S510), determining respective indications of signal power (e.g., at step S520), and generating the channel-based audio signal (e.g., at step S540) are performed based on a time-frequency representation of the spatial audio signal. For example, the aforementioned steps and other steps as suitable may be performed based on a discrete Fourier transform (such as a STFT, for example) of the spatial audio signal. For example, for each time segment (time block), the aforementioned steps may be performed based on the time-frequency bins (FFT bins) of the spatial audio signal, i.e., on the Fourier coefficients of the spatial audio signal.

Given the above, for each time segment, k, and for each dominant object index p ($1 \le p \le P$), energy band fraction information 22 can include a fraction value $e_{k,p,b}$ for each band b of a set of bands ($1 \le b \le B$). The fraction value $e_{k,p,b}$ is determined for the time segment k according to:

$$e_{k,p,b} = \frac{\text{Energy at direction } dir_{k,p} \text{ for band } b}{\text{Total energy in scene for band } b} \tag{19}$$

The fraction value $e_{k,p,b}$ may represent the fraction of energy in a spatial region around the direction $dir_{k,p}$, so that the energy of multiple acoustic objects in the original spatial audio scene may be combined to represent a single dominant acoustic component assigned to direction $dir_{k,p}$. In some embodiments, the energy of all acoustic objects in the scene may be weighted, using an angular difference weighting function $w(\theta)$ that represents a larger weighting for a direction, $\theta$, that is close to $dir_{k,p}$, and a smaller weighting for a direction, $\theta$, that is far from $dir_{k,p}$. Directional differences may be considered to be close for angular differences less than, for example, 10° and far for angular differences greater than, for example, 45°. In alternative embodiments, the weighting function may be chosen based on alternative choices of the close/far angular differences.

In general, the input spatial audio signal for which the compressed representation is generated may be a multichannel audio signal or an object-based audio signal, for example. In the latter case, the method for generating the compressed representation of the spatial audio signal would further comprise a step of converting the object-based audio signal to a multichannel audio signal prior to applying the scene analysis (e.g., prior to step S510).

In the example of FIG. 7, the input spatial audio signal may be a multichannel audio signal. Then, the channel-based audio signal generated at step S540 would be a downmix signal generated by applying a downmix operation to the multichannel audio signal.

Figure 8:
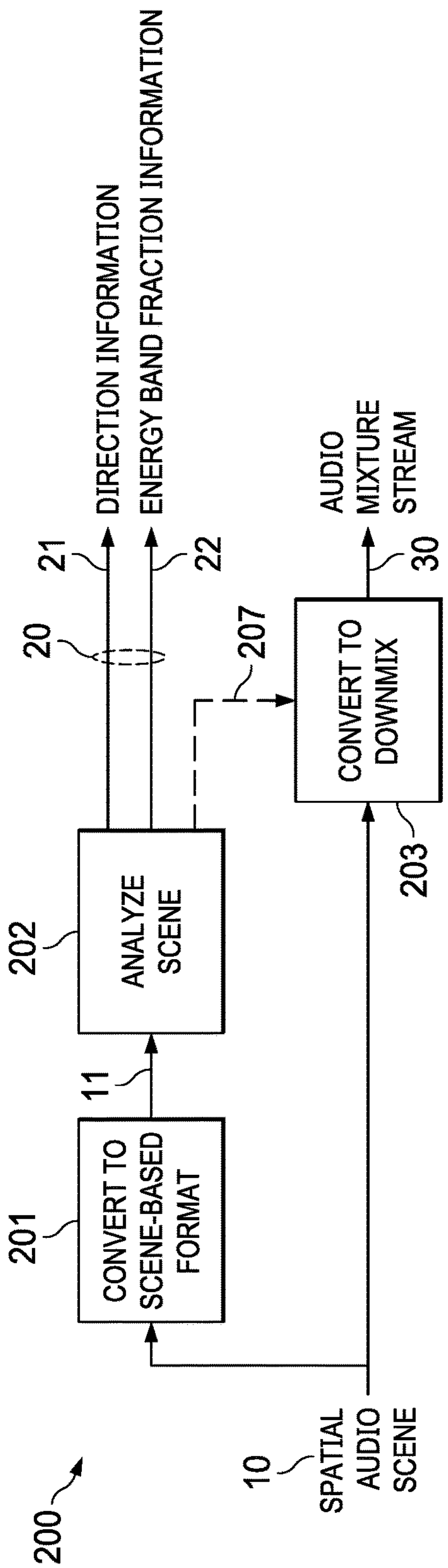

FIG. 8 schematically illustrates another example of details of generating the compressed representation of the spatial audio scene. The input spatial audio signal in this case may be an object-based audio signal that comprises a plurality of audio objects and associated direction vectors. In this case, the method of generating the compressed representation of the spatial audio signal comprises generating a multichannel audio signal, as an intermediate representation or intermediate scene, by panning the audio objects to a predefined set of audio channels, wherein each audio object is panned to the predefined set of audio channels in accordance with its direction vector. Thus, FIG. 8 shows an alternative embodiment of a scene encoder 200 wherein spatial audio scene 10 is input to a converter 201 that produces the intermediate scene 11 (e.g., embodied by the multichannel signal). Intermediate scene 11 may be created according Equation (1) where the panning function is selected so that the dot-product of panning gain vectors $\text{Pan}(\theta_1)$ and $\text{Pan}(\theta_2)$ approximately represents an angular difference weighting function, as described above.

In some embodiments, the panning function used in converter 201 is a third order Ambisonics panning function, $$\underset{3OA}{\text{Pan}}(\theta),$$

as shown in Equation (3). Accordingly, the multichannel audio signal may be a higher-order Ambisonics signal, for example.

The intermediate scene 11 is then input to scene analysis 202. Scene analysis 202 may determine the directions, $dir_{k,p}$, of dominant acoustic objects in the spatial audio scene from analysis of the intermediate scene 11. Determination of the dominant directions may be performed by estimating the energy in a set of directions, with the largest estimated energy representing the dominant direction.

Energy band fraction information 22 for time segment k may include a fraction value $e_{k,p,b}$ for each band b that is derived from the energy in band b of the intermediate scene 11 in each direction $dir_{k,p}$, relative to the total energy in band b of the intermediate scene 11 in time segment k.

The audio mixture stream 30 (e.g., channel-based audio signal) of the compact spatial audio scene (e.g., compact representation) in this case is a downmix signal generated by applying the downmix function 203 (downmix operation) to the spatial audio scene.

Figure 10:
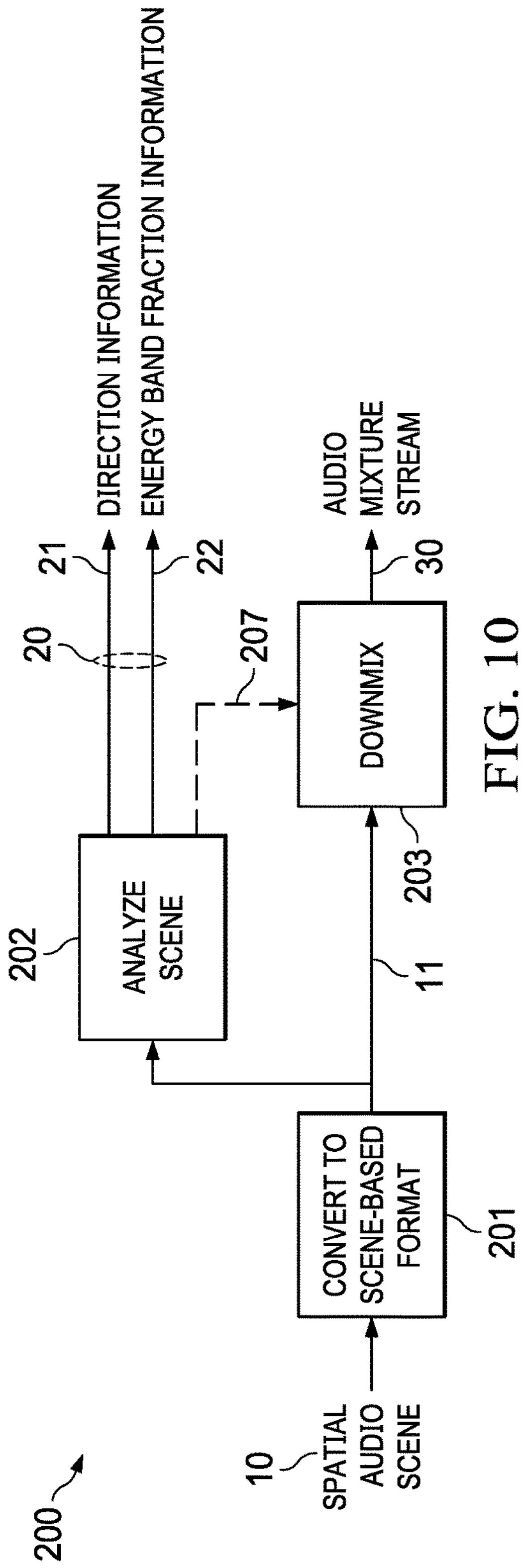

FIG. 10 shows an alternative arrangement of a scene encoder including a converter 201 to convert spatial audio scene 10 into a scene-based intermediate format 11. The intermediate format 11 is input to scene analysis 202 and to downmix function 203. In some embodiments, downmix function 203 may include a matrix mixer with coefficients adapted to convert intermediate format 11 into the audio mixture stream 30. That is, the audio mixture stream 30 (e.g., channel-based audio signal) of the compact spatial audio scene (e.g., compact representation) in this case may be a downmix signal generated by applying the downmix function 203 (downmix operation) to the intermediate scene (e.g., multichannel audio signal).

Figure 11:
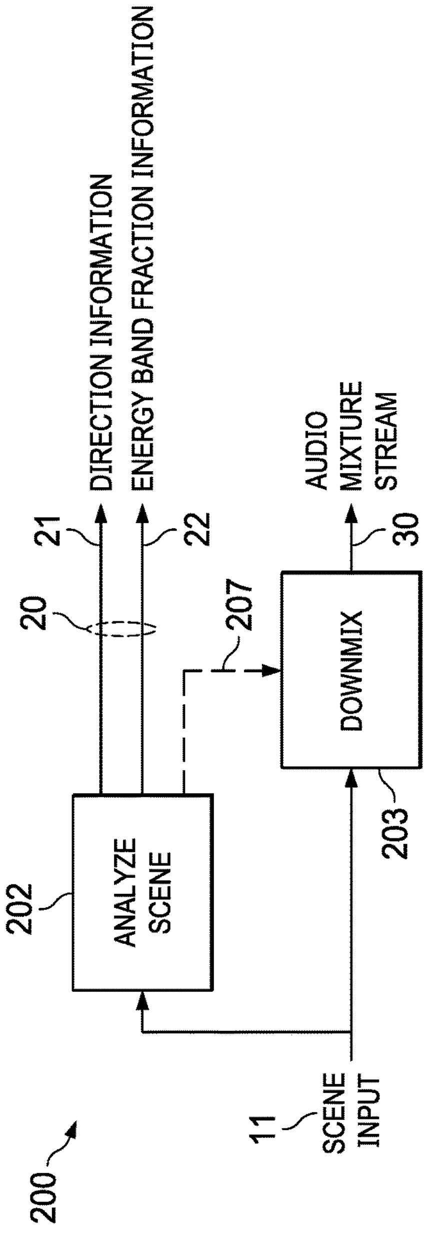

In an alternative embodiment, shown in FIG. 11, spatial encoder 200 may take input in the form of a scene-based input 11, wherein acoustic objects are represented according to a panning rule, $\text{Pan}(\theta)$. In some embodiments, the panning function may be a higher-order Ambisonics panning function. In one example embodiment, the panning function is a third-order Ambisonics panning function.

Figure 9:
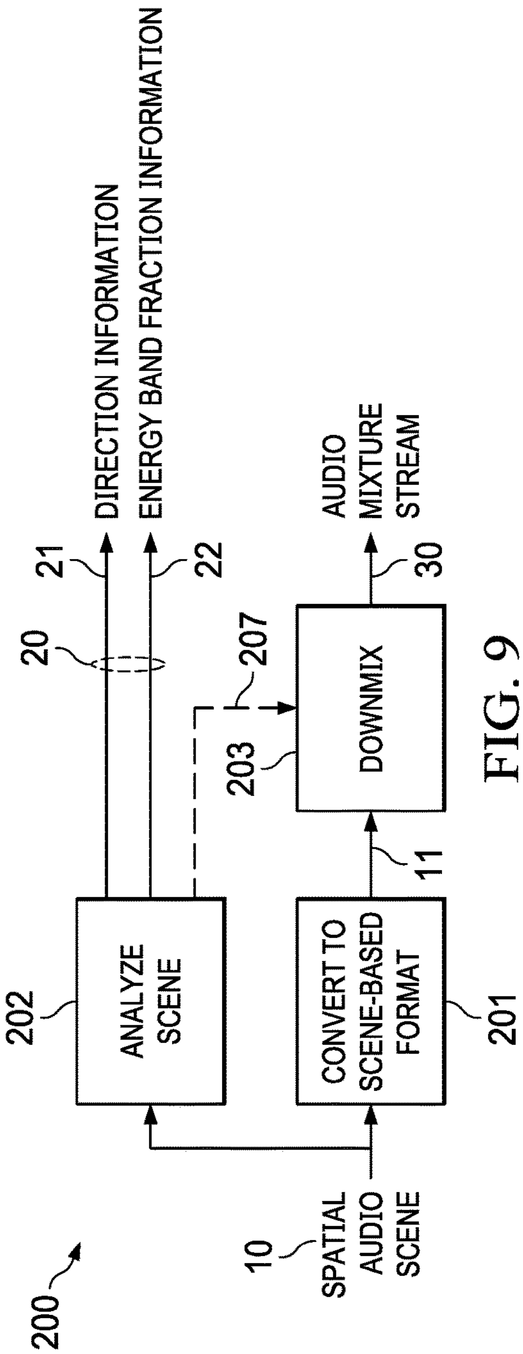

In another alternative embodiment, illustrated in FIG. 9, a spatial audio scene 10 is converted by converter 201 in spatial encoder 200 to produce an intermediate scene 11 which is input to downmix function 203. Scene analysis 202 is provided with input from the spatial audio scene 10.

Figure 12:
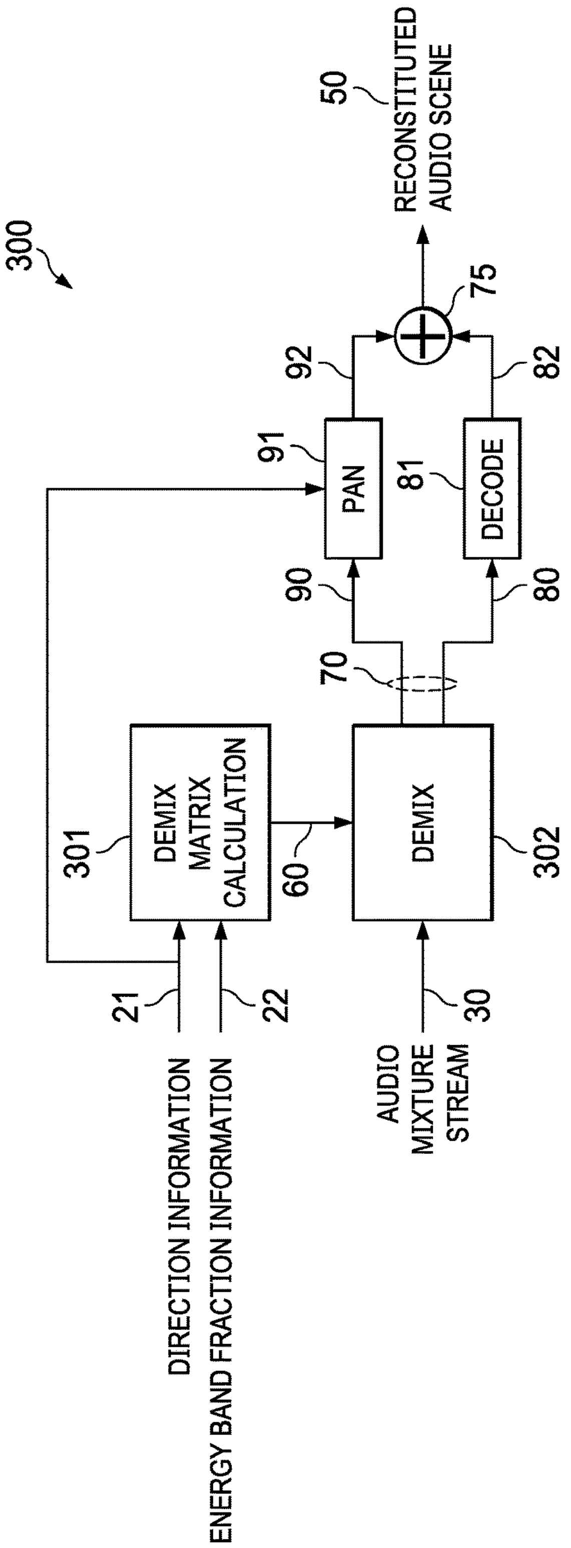

FIG. 12 schematically illustrates an example of details of decoding a compressed representation of a spatial audio scene to form a reconstituted audio scene, according to embodiments of the disclosure. Specifically, the figure shows a scene decoder 300 including a demixer 302 that takes an audio mixture stream 30 and produces a separated spatial audio stream 70. Separated spatial audio stream 70 is composed of P dominant object signals 90 and a residual stream 80. Residual decoder 81 takes input from residual stream 80 and creates a decoded residual stream 82. Object panner 91 takes input from dominant object signals 90 and creates panned object stream 92. Decoded residual stream 82 and panned object stream 92 are summed 75 to produce reconstituted audio scene 50.

Further, FIG. 12 shows direction information 21 and energy band fraction information 22 input to a demix matrix calculator 301 that determines a demix matrix 60 (inverse mixing matrix) to be used by demixer 302.

Details of processing the compact spatial audio scene (e.g., the compressed representation of the spatial audio signal) for generating the reconstructed representation of the spatial audio signal will be described next.

Figure 13:
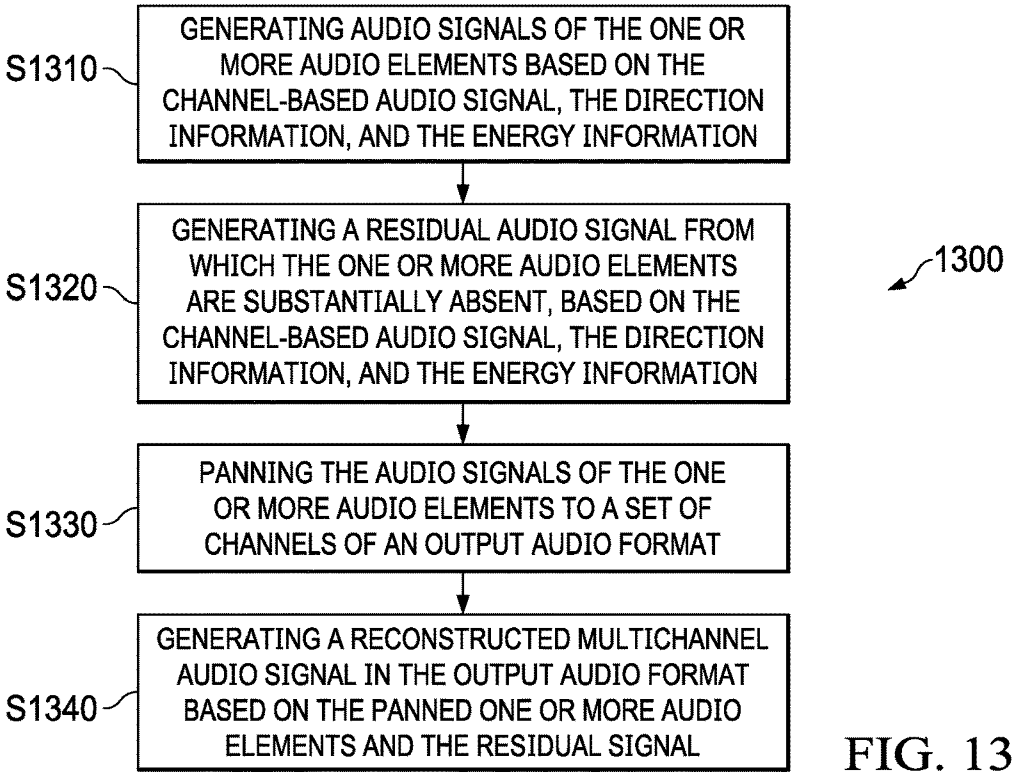
FIG. 13 is a flowchart illustrating an example of a method of decoding a compressed representation of a spatial audio scene to form a reconstituted audio scene, according to embodiments of the disclosure.

FIG. 13 is a flowchart of an example of a method 1300 of processing a compressed representation of a spatial audio signal for generating a reconstructed representation of the spatial audio signal. It is understood that the compressed representation comprises a channel-based audio signal (e.g., embodied by the audio mixture stream 30) with a predefined number of channels and metadata, the metadata comprising direction information (e.g., embodied by direction information 21) and energy information (e.g., embodied by energy band fraction information 22), with the direction information comprising indications of directions of arrival of one or more audio elements in an audio scene and the energy information comprising, for at least one frequency subband, respective indications of signal power associated with the directions of arrival. The channel-based audio signal may be a first-order Ambisonics signal, for example. The method 1300 comprises steps S1310 and S1320, and optionally, steps S1330 and S1340. It is understood that these steps may be performed by the scene decoder 300 of FIG. 12, for example.

At step S1310, audio signals of the one or more audio elements are generated based on the channel-based audio signal, the direction information, and the energy information.

At step S1320, a residual audio signal from which the one or more audio elements are substantially absent is generated, based on the channel-based audio signal, the direction information, and the energy information. Here, the residual signal may be represented in the same audio format as the channel-based audio signal, e.g., may have the same number of channels as the channel-based audio signal.

At optional step S1330, the audio signals of the one or more audio elements are panned to a set of channels of an output audio format. Here, the output audio format may relate to an output representation, for example, such as HOA or any other suitable multichannel format.

At optional step S1340, a reconstructed multichannel audio signal in the output audio format is generated based on the panned one or more audio elements and the residual signal. Generating the reconstructed multichannel audio signal may include upmixing the residual signal to the set of channels of the output audio format. Generating the reconstructed multichannel audio signal may further include adding the panned one or more audio elements and the upmixed residual signal.

It is understood that the above steps may be performed in any order or in parallel to each other, as long as the order of steps ensures that the necessary input for each step is available.

In line with the above description of methods of processing the spatial audio scene for generating the compressed representation of the spatial audio scene, an indication of signal power associated with a given direction of arrival may relate to a fraction of signal power in the frequency subband for the given direction of arrival in relation to the total signal power in the frequency subband.

Moreover, in some embodiments, the energy information may include indications of signal power for each of a plurality of frequency subbands. Then, an indication of signal power may relate, for a given direction of arrival and a given frequency subband, to a fraction of signal power in the given frequency subband for the given direction of arrival in relation to the total signal power in the given frequency subband.

Generating audio signals of the one or more audio elements at step S1310 may comprise determining coefficients of an inverse mixing matrix M for mapping the channel-based audio signal to an intermediate representation comprising the residual audio signal and the audio signals of the one or more audio elements, based on the direction information and the energy information. The intermediate representation can also be referred to as a separated or separable representation, or a hybrid representation.

Figure 14:
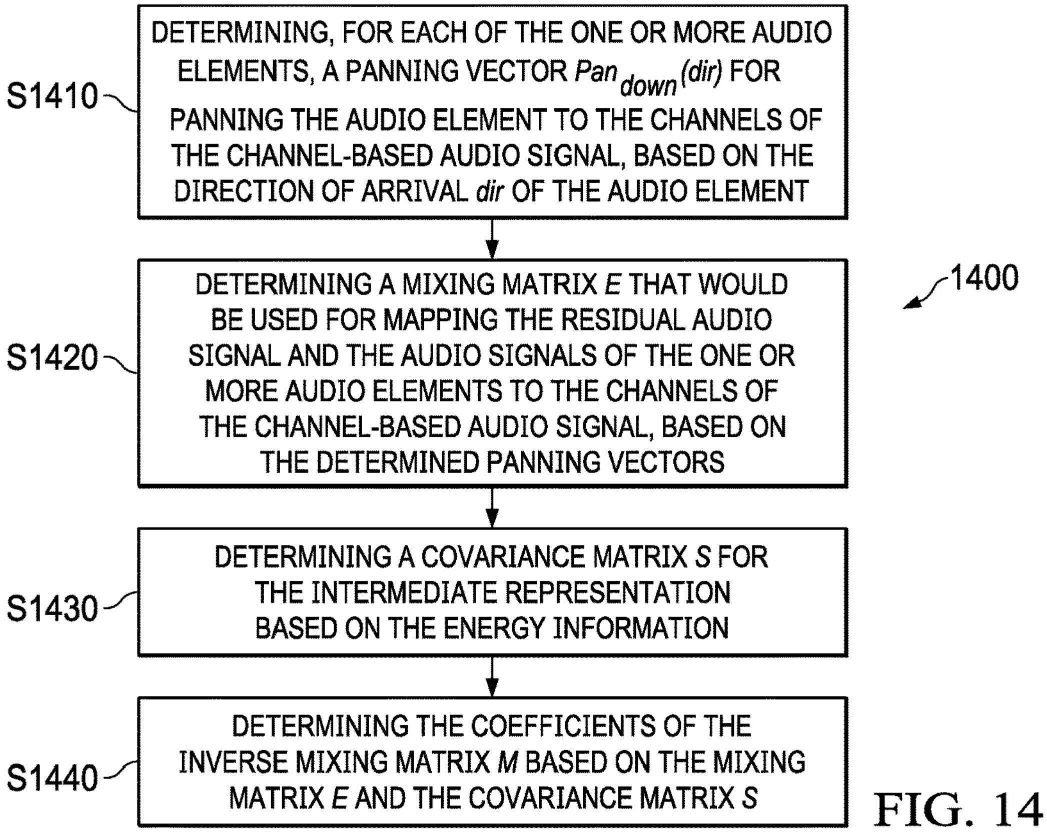
FIG. 14 is a flowchart illustrating details of the method of FIG. 13.

Details of said determining the coefficients of the inverse mixing matrix M will be described next with reference to the flowchart of FIG. 14. Method 1400 illustrated by this flowchart comprises steps S1410 through S1440.

At step S1410, for each of the one or more audio elements, a panning vector $Pan_{down}(dir)$ for panning the audio element to the channels of the channel-based audio signal is determined, based on the direction of arrival dir of the audio element.

At step S1420, a mixing matrix E that would be used for mapping the residual audio signal and the audio signals of the one or more audio elements to the channels of the channel-based audio signal is determined, based on the determined panning vectors.

At step S1430, a covariance matrix S for the intermediate representation is determined based on the energy information. Determination of the covariance matrix S may be further based on the determined panning vectors $Pan_{down}$.

Finally, at step S1440, the coefficients of the inverse mixing matrix M are determined based on the mixing matrix E and the covariance matrix S.

It is understood that the above steps may be performed in any order or in parallel to each other, as long as the order of steps ensures that the necessary input for each step is available.

Returning to FIG. 12, demix matrix calculator 301 computes the demix matrix 60 (inverse mixing matrix), $M_{k,b}$ according to a process that includes the following steps:

1. Inputs to the demix matrix calculator, for the time segment k, are the direction information, $dir_{k,p}$ ($1 \le p \le P$), and the energy band fraction information, $e_{k,p,b}$ ($1 \le p \le P$ and $1 \le b \le B$). P represents the number of dominant acoustic components and B indicates the number of frequency bands.
2. For each band, b, the demix matrix $M_{k,b}$ is computed according to:

$$M = S \times E^* \times (E \times S \times E^*)^{-1} \quad (20)$$

where "×" indicates the matrix product and "*" indicates the conjugate transpose of a matrix. The calculation according to Equation (20) may correspond to step S1440, for example.

The demix matrix M may be determined for each of a plurality of time segments k, and/or for each of a plurality of frequency subbands b. In that case, the matrices M and S would have an index k indicating the time segment and/or an index b indicating the frequency subband, and the matrix E would have an index k indicating the time segment, e.g., $$M_{k,b} = S_{k,b} \times E_k^* \times (E_k \times S_{k,b} \times E_k^*)^{-1} \quad (20a)$$

In general, determining the coefficients of the inverse mixing matrix M based on the mixing matrix E and the covariance matrix S may involve determining a pseudo inverse based on the mixing matrix E and the covariance matrix S. One example of such pseudo inverse is given in Equations (20) and (20a).

In Equation (20), the matrix $E_k$ (mixing matrix) is formed by stacking together an N×N identity matrix ($I_N$) and the P columns formed by the panning function applied to the directions of each of the P dominant acoustic components:

$$E = (I_N \mid \mathrm{Pan}_{down}(dir_1) \mid \ldots \mid \mathrm{Pan}_{down}(dir_P)) \quad (21)$$

In Equation (21), $I_N$ is an N×N identity matrix, with N indicating the number of channels of the channel-based signal. $\mathrm{Pan}_{down}(\mathrm{dir}_p)$ is the panning vector for the p-th audio element with associated direction of arrival $\mathrm{dir}_p$ that would pan the p-th audio element to the N channels of the channel-based signal, with p=1, . . . , P indicating a respective one among the one or more audio elements and P indicating the total number of the one or more audio elements. The vertical bars in Equation (21) indicate a matrix augmentation operation. Accordingly, the matrix E is a N×P matrix.

Further, the matrix E may be determined for each of a plurality of time segments k. In that case, the matrix E and the directions of arrival $\mathrm{dir}_p$ would have an index k indicating the time segment, e.g., $$E_k = (I_N \mid \mathrm{Pan}_{down}(dir_{k,1}) \mid \ldots \mid \mathrm{Pan}_{down}(dir_{k,P})) \quad (21a)$$

If the proposed method operates in a band-wise manner, the matrix E may be the same for all frequency subbands.

In accordance with step S1420, matrix $E_k$ is the mixing matrix that would be used for mapping the residual audio signal and the audio signals of the one or more audio elements to the channels of the channel-based audio signal. As can be seen from Equations (21) and (21a), the matrix $E_k$ is based on the panning vectors $\mathrm{Pan}_{down}(\mathrm{dir})$ determined at step S1410.

In Equation (20), the matrix S is a (N+P)×(N+P) diagonal matrix. It can be seen as a covariance matrix for the intermediate representation. Its coefficients can be calculated based on the energy information, in accordance with step S1430. The first N diagonal elements are given by $$\{S\}_{n,n} = \mathrm{rms}(\mathrm{Pan}_{down})_n \left(1 - \sum_{p=1}^{P} e_p\right) \quad (22)$$

for 1≤n≤N, and the remaining P diagonal elements are given by $$\{S\}_{N+p,N+p} = e_p \quad (23)$$

for 1≤p≤P, where $e_p$ is the signal power associated with the direction of arrival of the p-th audio element.

The covariance matrix S may be determined for each of a plurality of time segments k, and/or for each of a plurality of frequency subbands b. In that case, the covariance matrix S and the signal powers $e_p$ would have an index k indicating the time segment and/or an index b indicating the frequency subband. The first N diagonal elements would be given by $$\{S_{k,b}\}_{n,n} = \mathrm{rms}\left(\mathrm{Pan}_{down}\right)_n \left(1 - \sum_{p=1}^{P} e_{k,p,b}\right) (1 \le n \le N) \quad (22a)$$

and the remaining P diagonal elements would be given by $$\{S_{k,b}\}_{N+p,N+p} = e_{k,p,b} (1 \le p \le P) \quad (23a)$$

In a preferred embodiment, the demix matrix $M_{k,b}$ is applied, by demixer 302, to produce a separated spatial audio stream 70 (as an example of the intermediate representation), in accordance with the above-described implementation of step S1310, wherein the first N channels are the residual stream 80 and the remaining P channels represent the dominant acoustic components.

The N+P channel separated spatial stream 70, $Y_k(f)$, the P channel dominant object signals 90 (as examples of the audio signals of the one or more audio elements generated at step S1310), $O_k(f)$, and the N channel residual stream 80 (as an example of the residual audio signal generated at step S1320), $R_k(f)$, are computed from the N-channel audio mixture 30, $X_k(f)$, according to:

$$Y_k(f) = \sum_{b=1}^{B} FR_b(f) M_{k,b} \times X_k \quad (24)$$

$$R_k(f) = \{Y_k(f)\}_{1..N}$$

$$O_k(f) = \{Y_k(f)\}_{N+1..N+P}$$

wherein the signals are represented in STFT form, the expression $\{Y_k(f)\}_{1 \ldots N}$ indicates an N-channel signal formed from channels 1 . . . N of $Y_k(f)$, and $\{Y_k(f)\}_{N+1 \ldots N+P}$ indicates a P-channel signal formed from channels N+1 . . . N+P of $Y_k(f)$. It will be appreciated by those skilled in the are that the application of the matrix $M_{k,b}$ may be achieved according to alternative methods, known in the art, that provide an equivalent approximate function to that of Equation (24).

In addition to the above, in some embodiments, the number of dominant acoustic components P may be adapted to take a different value for each time segment, so that $P_k$ may be dependent on the time segment index, k. For example, the scene analysis 202 in the scene encoder 200 may determine a value of $P_k$ for each time segment. In general, the number of dominant acoustic components P may be time-dependent. The choice of P (or $P_k$) may include a trade-off between the metadata data-rate and the quality of the reconstructed audio scene.

Returning to FIG. 12, the spatial decoder 300 produces an M-channel reconstituted audio scene 50 wherein the M-channel stream is associated with an output panner $$\underset{out}{\mathrm{Pan}}(\theta).$$

This may be done in accordance with step S1340 described above. Examples of output panners include stereo panning functions, vector-based amplitude panning functions as known in the art, and higher-order Ambisonics panning functions, as known in the art.

For example, object panner 91 in FIG. 12 may be adapted to create the M-channel panned object stream 92, $Z_P$, according to $$Z_P(f) = \sum_{p=1}^{P} \underset{out}{\mathrm{Pan}}(\theta_p) O_{k,p}(f) \tag{25}$$

Figure 15:
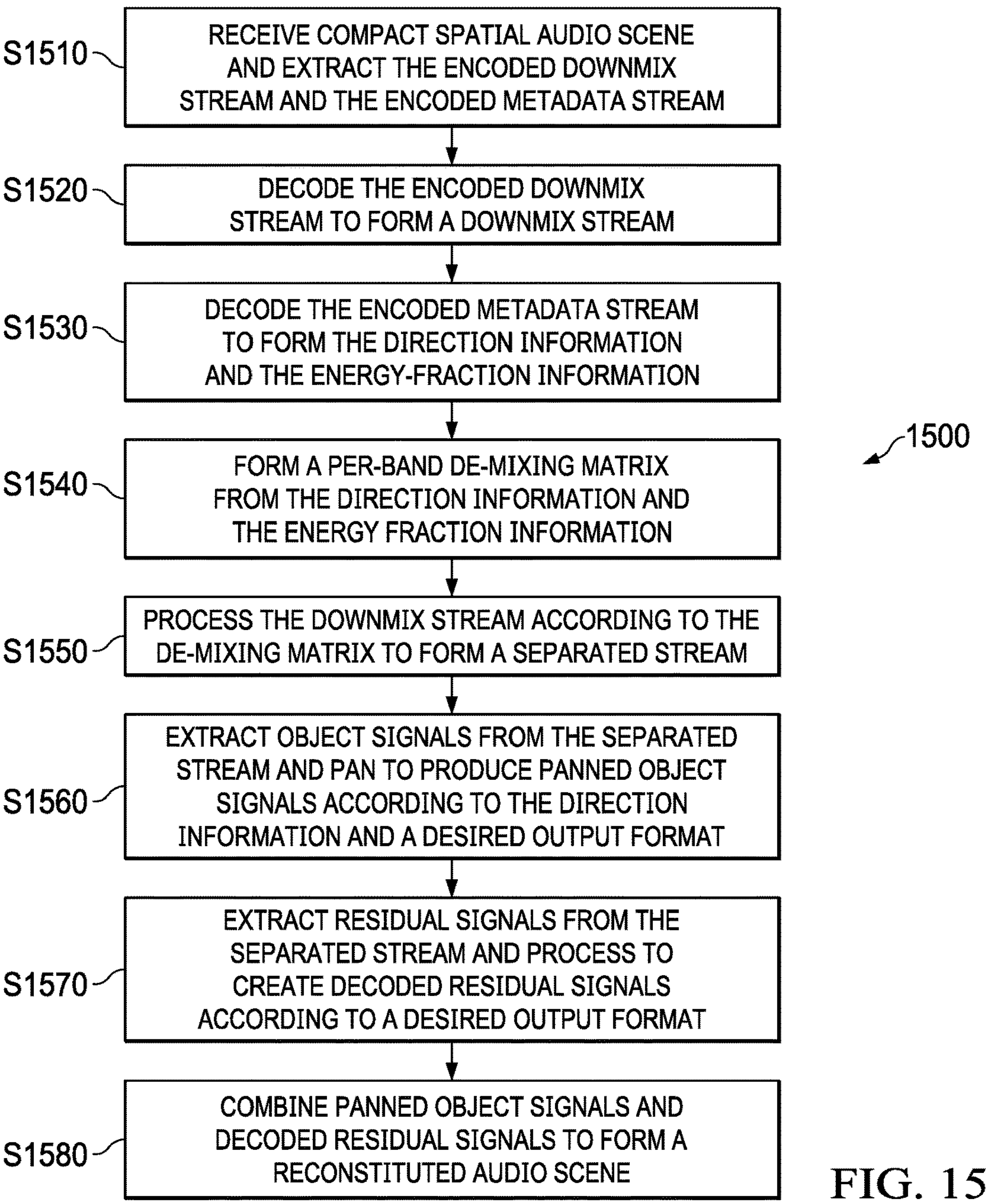
FIG. 15 is a flowchart illustrating another example of a method of decoding a compressed representation of a spatial audio scene to form a reconstituted audio scene, according to embodiments of the disclosure, and FIG. 16 schematically illustrates an apparatus for generating a compressed representation of a spatial audio scene and/or decoding the compressed representation of a spatial audio scene to form a reconstituted audio scene, according to embodiments of the disclosure.

FIG. 15 is a flowchart providing an alternative formulation of a method 1500 of decoding a compact spatial audio scene to produce a reconstituted audio scene. Method 1500 comprises steps S1510 through S1580.

At step S1510, a compact spatial audio scene is received and the encoded downmix stream and the encoded metadata stream are extracted.

At step S1520, the encoded downmix stream is decoded to form a downmix stream.

At step S1530, the encoded metadata stream is decoded to form the direction information and the energy fraction information.

At step S1540, a per-band demixing matrix is formed from the direction information and the energy fraction information.

At step S1550, the downmix stream is processed according to the demixing matrix to form a separated stream.

At step S1560, object signals are extracted from the separated stream and panned to produce panned object signals according to the direction information and a desired output format.

At step S1570, residual signals are extracted from the separated stream and processed to create decoded residual signals according to the desired output format.

Finally, at step S1580, panned object signals and decoded residual signals are combined to form a reconstituted audio scene.

It is understood that the above steps may be performed in any order or in parallel to each other, as long as the order of steps ensures that the necessary input for each step is available.

Figure 16:
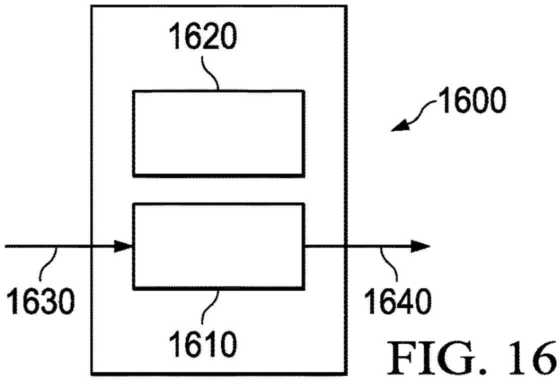

Methods of processing a spatial audio signal for generating a compressed representation of the spatial audio signal, as well as methods of processing a compressed representation of a spatial audio signal for generating a reconstructed representation of the spatial audio signal have been described above. Additionally, the present disclosure also relates to an apparatus for carrying out these methods. An example of such apparatus 1600 is schematically illustrated in FIG. 16. The apparatus 1600 may comprise a processor 1610 (e.g., a central processing unit (CPU), a graphics processing unit (GPU), a digital signal processor (DSP), one or more application specific integrated circuits (ASICs), one or more radio-frequency integrated circuits (RFICs), or any combination of these) and a memory 1620 coupled to the processor 1610. The processor may be adapted to carry out some or all of the steps of the methods described throughout the disclosure. If the apparatus 1600 acts as an encoder (e.g., scene encoder), it may receive, as input 1630, the spatial audio signal (i.e., the spatial audio scene), for example. The apparatus 1600 may then generate, as output 1640, the compressed representation of the spatial audio signal. If the apparatus 1600 acts as a decoder (e.g., scene decoder), it may receive, as input 1630, the compressed representation. The apparatus may then generate, as output 1640, the reconstituted audio scene.

The apparatus 1600 may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions (sequential or otherwise) that specify actions to be taken by that apparatus. Further, while only a single apparatus 1600 is illustrated in FIG. 16, the present disclosure shall relate to any collection of apparatus that individually or jointly execute instructions to perform any one or more of the methodologies discussed herein.

The present disclosure further relates to a program (e.g., computer program) comprising instructions that, when executed by a processor, cause the processor to carry out some or all of the steps of the methods described herein.

Yet further, the present disclosure relates to a computer-readable (or machine-readable) storage medium storing the aforementioned program. Here, the term "computer-readable storage medium" includes, but is not be limited to, data repositories in the form of solid-state memories, optical media, and magnetic media, for example.

Additional Configuration Considerations

Unless specifically stated otherwise, as apparent from the following discussions, it is appreciated that throughout the disclosure discussions utilizing terms such as "processing," "computing," "calculating," "determining", analyzing" or the like, refer to the action and/or processes of a computer or computing system, or similar electronic computing devices, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one example embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The processing system may also encompass a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one or more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code. Furthermore, a computer-readable carrier medium may form, or be included in a computer program product.

In alternative example embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a Personal Digital Assistant (PDA), a cellular telephone, a web appliance, a network router, switch or bridge, or any machine capable of executing a set of instructions (sequential or otherwise) that specify actions to be taken by that machine.

Note that the term "machine" shall also be taken to include any collection of machines that individually or jointly execute a set (or multiple sets) of instructions to perform any one or more of the methodologies discussed herein.

Thus, one example embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, example embodiments of the present disclosure may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present disclosure may take the form of a method, an entirely hardware example embodiment, an entirely software example embodiment or an example embodiment combining software and hardware aspects. Furthermore, the present disclosure may take the form of carrier medium (e.g., a computer program product on a computer-readable storage medium) carrying computer-readable program code embodied in the medium.

The software may further be transmitted or received over a network via a network interface device. While the carrier medium is in an example embodiment a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present disclosure. A carrier medium may take many forms, including but not limited to, non-volatile media, volatile media, and transmission media. Non-volatile media includes, for example, optical, magnetic disks, and magneto-optical disks.

Volatile media includes dynamic memory, such as main memory. Transmission media includes coaxial cables, copper wire and fiber optics, including the wires that comprise a bus subsystem. Transmission media may also take the form of acoustic or light waves, such as those generated during radio wave and infrared data communications. For example, the term "carrier medium" shall accordingly be taken to include, but not be limited to, solid-state memories, a computer product embodied in optical and magnetic media; a medium bearing a propagated signal detectable by at least one processor or one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one example embodiment by an appropriate processor (or processors) of a processing (e.g., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Reference throughout this disclosure to "one example embodiment", "some example embodiments" or "an example embodiment" means that a particular feature, structure or characteristic described in connection with the example embodiment is included in at least one example embodiment of the present disclosure. Thus, appearances of the phrases "in one example embodiment", "in some example embodiments" or "in an example embodiment" in various places throughout this disclosure are not necessarily all referring to the same example embodiment. Furthermore, the particular features, structures or characteristics may be combined in any suitable manner, as would be apparent to one of ordinary skill in the art from this disclosure, in one or more example embodiments.

As used herein, unless otherwise specified the use of the ordinal adjectives "first", "second", "third", etc., to describe a common object, merely indicate that different instances of like objects are being referred to and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of example embodiments of the disclosure, various features of the disclosure are sometimes grouped together in a single example embodiment, figure, or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed example embodiment. Thus, the claims following the Description are hereby expressly incorporated into this Description, with each claim standing on its own as a separate example embodiment of this disclosure.

Furthermore, while some example embodiments described herein include some but not other features included in other example embodiments, combinations of features of different example embodiments are meant to be within the scope of the disclosure, and form different example embodiments, as would be understood by those skilled in the art. For example, in the following claims, any of the claimed example embodiments can be used in any combination.

In the description provided herein, numerous specific details are set forth. However, it is understood that example embodiments of the disclosure may be practiced without these specific details. In other instances, well-known methods, structures and techniques have not been shown in detail in order not to obscure an understanding of this description.

Thus, while there has been described what are believed to be the best modes of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

Further aspects, embodiments, and example implementations of the present disclosure will become apparent from the enumerated example embodiments (EEEs) listed below.

EEE 1 relates to a method for representing a spatial audio scene as a compact spatial audio scene comprising an audio mixture stream and a direction metadata stream, wherein said audio mixture stream is comprised of one or more audio signals, and wherein said direction metadata stream is comprised of a time series of direction metadata blocks with each of said direction metadata blocks being associated with a corresponding time segment in said audio signals, and wherein said spatial audio scene includes one or more directional sonic elements that are each associated with a respective direction of arrival, and wherein each of said direction metadata blocks contains: (a) direction information indicative of the said directions of arrival for each of said directional sonic elements, and (b) Energy Band Fraction Information indicative of the energy in each of said directional sonic elements, relative to the energy in the said corresponding time segment in said audio signals, for each of said directional sonic elements and for each of a set of two or more subbands.

EEE 2 relates to the method according to EEE 1, wherein (a) said Energy Band Fraction Information is indicative of the properties of said spatial audio scene in each of a number of said subbands, and (b) for at least one direction of arrival, the data included in said Direction Information is indicative of the properties of said spatial audio scene in a cluster of two or more of said subbands.

EEE 3 relates to a method for processing a compact spatial audio scene comprising an audio mixture stream and a direction metadata stream, to produce a separated spatial audio stream comprising a set of one or more audio object signals and a residual stream, wherein said audio mixture stream is comprised of one or more audio signals, and wherein said direction metadata stream is comprised of a time series of direction metadata blocks with each of said direction metadata blocks being associated with a corresponding time segment in said audio signals, wherein for each of a plurality of subbands, the method comprises: (a) determining the coefficients of a de-mixing matrix from Direction Information and Energy Band Fraction information contained in the direction metadata stream, and (b) mixing, using said de-mixing matrix, the said audio mixture stream to produce the said separated spatial audio stream.

EEE 4 relates to the method according to EEE 3, wherein each of said direction metadata blocks contains: (a) direction information indicative of the directions of arrival for each of said directional sonic elements, and (b) Energy Band Fraction Information indicative of the energy in each of said directional sonic elements, relative to the energy in the said corresponding time segment in said audio signals, for each of said directional sonic elements and for each of a set of two or more subbands.

EEE 5 relates to the method according to EEE 3, wherein (a) for each of said direction metadata blocks, said Direction Information and said Energy Band Fraction Information is used to form a matrix, S, representing the approximate covariance of the said separated spatial audio stream, and (a) said Energy Band Fraction Information is used to form a matrix, E, representing the re-mixing matrix that defines the conversion of the said separated spatial audio stream into the audio mixture stream, and (b) the said de-mixing matrix, U, is computed according to $U=S\times E^{*}\times(E\times S\times E^{*})^{-1}$.

EEE 6 relates to the method according to EEE 5, where the matrix, S, is a diagonal matrix.

EEE 7 relates to the method according to EEE 3, wherein (a) said residual stream is processed to produce a reconstructed residual stream, (b) each of said audio object signals are processed to produce a corresponding reconstructed object stream, and (c) said reconstructed residual stream and each of said reconstructed object streams are combined to form a Reconstituted Audio Signals, wherein said Reconstructed Audio Signals include directional sonic elements according to the said compact spatial audio scene.

EEE 8 relates to the method according to EEE 7, wherein said Reconstituted Audio Signals include two signals for presentation to a listener via transducers at or near each ear so as to provide a binaural experience of a spatial audio scene including directional sonic elements according to the said compact spatial audio scene.

EEE 9 relates to the method according to EEE 7, wherein said Reconstituted Audio Signals include a number of signals that represent a spatial audio scene in the form of spherical-harmonic panning functions.

EEE 10 relates to a method for processing a spatial audio scene to produce a compact spatial audio scene comprising an audio mixture stream and a direction metadata stream, wherein said spatial audio scene includes one or more directional sonic elements that are each associated with a respective direction of arrival, and wherein said direction metadata stream is comprised of a time series of direction metadata blocks with each of said direction metadata blocks being associated with a corresponding time segment in said audio signals, said method including: (a) a means for determining the said direction of arrival for one or more of said directional sonic elements, from analysis of said spatial audio scene, (b) a means for determining what fraction of the total energy in the said spatial scene is contributed by the energy in each of said directional sonic elements, and (c) a means for processing said spatial audio scene to produce said audio mixture stream.

The invention claimed is:

1. A method of processing a spatial audio signal for generating a compressed representation of the spatial audio signal, the method comprising:

analyzing the spatial audio signal to determine directions of arrival for one or more audio elements in an audio scene represented by the spatial audio signal, wherein analyzing the spatial audio signal is based on a plurality of frequency subbands of the spatial audio signal;

for at least one frequency subband of the spatial audio signal, determining respective indications of signal power associated with the determined directions of arrival;

generating metadata comprising direction information and energy information, with the direction information comprising indications of the determined directions of arrival of the one or more audio elements and the energy information comprising respective indications of signal power associated with the determined directions of arrival;

generating a channel-based audio signal with a predefined number of channels based on the spatial audio signal; and outputting, as the compressed representation of the spatial audio signal, the channel-based audio signal and the metadata.

* * * * *